(12) United States Patent
Davis et al.

(10) Patent No.: US 8,081,820 B2
(45) Date of Patent: Dec. 20, 2011

(54) METHOD FOR PARTITIONING A PATTERN INTO OPTIMIZED SUB-PATTERNS

(75) Inventors: Jason Davis, Bellingham, MA (US); Juha Koljonen, Needham, MA (US)

(73) Assignee: Cognex Technology and Investment Corporation, Mt. View, CA (US)

( * ) Notice: Subject to any disclaimer, the term of this patent is extended or adjusted under 35 U.S.C. 154(b) by 1164 days.

(21) Appl. No.: 10/625,201

(22) Filed: Jul. 22, 2003

(65) Prior Publication Data

US 2005/0117801 A1 Jun. 2, 2005

(51) Int. Cl.
- *G06K 9/34* (2006.01)
- *G06K 9/46* (2006.01)
- *G06K 9/66* (2006.01)

(52) U.S. Cl. ........ 382/173; 382/181; 382/190; 382/209; 382/224; 382/225

(58) Field of Classification Search ................. 382/173, 382/181, 190, 209, 224, 225
See application file for complete search history.

(56) References Cited

U.S. PATENT DOCUMENTS

| | | |
|---|---|---|
| 3,069,654 A | 12/1962 | Hough |
| 3,560,930 A | 2/1971 | Howard |
| 3,816,722 A | 6/1974 | Sakoe et al. |
| 3,898,617 A | 8/1975 | Kashioka et al. |
| 3,899,240 A | 8/1975 | Gabor |
| 3,899,771 A | 8/1975 | Saraga et al. |
| 3,936,800 A | 2/1976 | Ejiri et al. |
| 3,986,007 A | 10/1976 | Ruoff |
| 4,115,702 A | 9/1978 | Nopper |
| 4,115,762 A | 9/1978 | Akiyama |
| 4,146,924 A | 3/1979 | Birk et al. |
| 4,183,013 A | 1/1980 | Agrawala et al. |
| 4,200,861 A | 4/1980 | Hubach et al. |
| 4,213,150 A | 7/1980 | Robinson et al. |
| 4,295,198 A | 10/1981 | Copeland et al. |
| 4,441,205 A | 4/1984 | Berkin et al. |

(Continued)

FOREIGN PATENT DOCUMENTS

DE 4406020 6/1995

(Continued)

OTHER PUBLICATIONS

Shi et al., Normalized Cuts and Image Segmentation, Aug. 2000, IEEE Transactions on pattern analysis and machine intelligence, vol. 22, No. 8, pp. 888-905.*

(Continued)

*Primary Examiner* — Bhavesh M Mehta
*Assistant Examiner* — John B Strege (57) ABSTRACT

A method is provided for dividing a pattern into a plurality of sub-patterns, each sub-pattern being adapted for use with an image search method that can provide a plurality of sub-pattern search results. The method represents the pattern as a plurality of feature points, generates candidate partitions of the plurality of feature points, and then scores the candidate partitions by examining characteristics of each potential sub-pattern of each candidate partition. The highest-scoring partition is selected, and then it is applied to the plurality of feature points, creating one or more sub-pluralities of features. The invention advantageously provides a plurality of sub-patterns where each sub-pattern contains enough information to be located with a feature-based search method, where that information has been pre-evaluated as being useful and particularly adapted for running feature-based searches.

45 Claims, 6 Drawing Sheets

U.S. PATENT DOCUMENTS

| | | | |
|---|---|---|---|
| 4,441,206 A | 4/1984 | Kuniyoshi et al. |
| 4,441,248 A | 4/1984 | Sherman et al. |
| 4,567,610 A | 1/1986 | McConnell |
| 4,570,180 A | 2/1986 | Baier et al. |
| 4,581,762 A | 4/1986 | Lapidus et al. |
| 4,618,989 A | 10/1986 | Tsukune et al. |
| 4,637,055 A | 1/1987 | Taylor |
| 4,651,341 A | 3/1987 | Nakashima et al. |
| 4,672,676 A | 6/1987 | Linger |
| 4,685,143 A | 8/1987 | Choate |
| 4,688,088 A | 8/1987 | Hamazaki et al. |
| 4,707,647 A | 11/1987 | Coldrenet et al. |
| 4,736,437 A | 4/1988 | Sacks et al. |
| 4,763,280 A | 8/1988 | Robinson et al. |
| 4,783,826 A | 11/1988 | Koso |
| 4,783,829 A | 11/1988 | Miyakawa et al. |
| 4,799,175 A | 1/1989 | Sano et al. |
| 4,809,348 A | 2/1989 | Meyer et al. |
| 4,823,394 A | 4/1989 | Berkin et al. |
| 4,843,631 A | 6/1989 | Steinpichler et al. |
| 4,845,765 A | 7/1989 | Juvin et al. |
| 4,849,914 A | 7/1989 | Medioni et al. |
| 4,860,374 A | 8/1989 | Murakami et al. |
| 4,876,457 A | 10/1989 | Bose |
| 4,876,728 A | 10/1989 | Roth |
| 4,893,346 A | 1/1990 | Bishop |
| 4,903,313 A | 2/1990 | Tachikawa |
| 4,922,543 A | 5/1990 | Ahlbom et al. |
| 4,955,062 A | 9/1990 | Terui |
| 4,959,898 A | 10/1990 | Landman et al. |
| 4,972,359 A | 11/1990 | Silver et al. |
| 4,979,223 A | 12/1990 | Manns et al. |
| 4,980,971 A | 1/1991 | Bartschat et al. |
| 5,003,166 A | 3/1991 | Girod |
| 5,020,006 A | 5/1991 | Sporon-Fiedler |
| 5,027,417 A | 6/1991 | Kitakado et al. |
| 5,033,099 A | 7/1991 | Yamada et al. |
| 5,040,231 A | 8/1991 | Terzian |
| 5,046,109 A | 9/1991 | Fujimori et al. |
| 5,048,094 A | 9/1991 | Aoyama et al. |
| 5,060,276 A | 10/1991 | Morris et al. |
| 5,072,384 A | 12/1991 | Doi et al. |
| 5,086,478 A | 2/1992 | Kelly-Mahaffey et al. |
| 5,093,867 A | 3/1992 | Hori et al. |
| 5,111,516 A | 5/1992 | Nakano et al. |
| 5,113,565 A | 5/1992 | Cipolla et al. |
| 5,161,201 A | 11/1992 | Kaga et al. |
| 5,168,530 A | 12/1992 | Peregrim et al. |
| 5,177,559 A | 1/1993 | Batchelder et al. |
| 5,206,917 A | 4/1993 | Ueno et al. |
| 5,220,621 A | 6/1993 | Saitoh |
| 5,226,095 A | 7/1993 | Okumura et al. |
| 5,245,674 A | 9/1993 | Cass et al. |
| 5,253,306 A | 10/1993 | Nishio |
| 5,268,999 A | 12/1993 | Yokoyama |
| 5,272,657 A | 12/1993 | Basehore et al. |
| 5,280,351 A | 1/1994 | Wilkinson |
| 5,313,532 A | 5/1994 | Harvey et al. |
| 5,343,028 A | 8/1994 | Figarella et al. |
| 5,343,390 A | 8/1994 | Doi et al. |
| 3,531,310 A | 9/1994 | Califano et al. |
| 5,347,595 A | 9/1994 | Bokser |
| 5,351,310 A | 9/1994 | Califano et al. |
| 5,371,690 A | 12/1994 | Engel et al. |
| 5,384,711 A | 1/1995 | Kanai et al. |
| 5,398,292 A | 3/1995 | Aoyama |
| 5,406,642 A | 4/1995 | Maruya |
| 5,459,636 A | 10/1995 | Gee et al. |
| 5,471,541 A | 11/1995 | Burtnyk et al. |
| 5,481,712 A | 1/1996 | Silver et al. |
| 5,495,537 A | 2/1996 | Bedrosian et al. |
| 5,497,451 A | 3/1996 | Holmes |
| 5,500,906 A | 3/1996 | Picard et al. |
| 5,513,275 A | 4/1996 | Khalaj et al. |
| 5,515,453 A | 5/1996 | Hennessey et al. |
| 5,524,064 A | 6/1996 | Oddou et al. |
| 5,537,669 A | 7/1996 | Evans et al. |
| 5,539,841 A | 7/1996 | Huttenlocher et al. |
| 5,544,254 A | 8/1996 | Hartley et al. |
| 5,545,887 A | 8/1996 | Smith et al. |
| 5,550,763 A | 8/1996 | Michael et al. |
| 5,550,937 A | 8/1996 | Bell et al. |
| 559,901 A | 9/1996 | Lobregt |
| 5,555,317 A | 9/1996 | Anderson |
| 5,555,320 A | 9/1996 | Irie et al. |
| 5,557,684 A | 9/1996 | Wang et al. |
| 5,559,901 A | 9/1996 | Lobregt |
| 5,568,563 A | 10/1996 | Tanaka et al. |
| 5,570,430 A | 10/1996 | Sheehan et al. |
| 5,586,058 A | 12/1996 | Aloni et al. |
| 5,602,937 A | 2/1997 | Bedrosian et al. |
| 5,602,938 A | 2/1997 | Akiyama et al. |
| 5,613,013 A | 3/1997 | Schuette |
| 5,621,807 A | 4/1997 | Eibert et al. |
| 5,623,560 A | 4/1997 | Nakajima et al. |
| 5,625,707 A | 4/1997 | Diep et al. |
| 5,625,715 A | 4/1997 | Trew et al. |
| 5,627,912 A | 5/1997 | Matsumoto |
| 5,627,915 A | 5/1997 | Rosser et al. |
| 5,631,975 A | 5/1997 | Riglet et al. |
| 5,633,951 A | 5/1997 | Moshfeghi |
| 5,638,116 A | 6/1997 | Shimoura et al. |
| 5,638,489 A | 6/1997 | Tsuboka |
| 5,650,828 A | 7/1997 | Lee |
| 5,657,403 A | 8/1997 | Wolff et al. |
| 5,663,809 A | 9/1997 | Miyaza et al. |
| 5,673,334 A | 9/1997 | Nichani et al. |
| 5,686,973 A | 11/1997 | Lee |
| 5,694,482 A | 12/1997 | Maali et al. |
| 5,694,487 A | 12/1997 | Lee |
| 5,703,960 A | 12/1997 | Soest |
| 5,703,964 A | 12/1997 | Menon et al. |
| 5,708,731 A | 1/1998 | Shimotori et al. |
| 5,717,785 A | 2/1998 | Silver |
| 5,754,226 A | 5/1998 | Yamada et al. |
| 5,768,421 A | 6/1998 | Gaffin et al. |
| 5,793,901 A | 8/1998 | Matsutake et al. |
| 5,796,868 A | 8/1998 | Dutta-Choudhury et al. |
| 5,815,198 A | 9/1998 | Vachtsevanos et al. |
| 5,822,742 A | 10/1998 | Alkon et al. |
| 5,825,913 A | 10/1998 | Rostami et al. |
| 5,825,922 A | 10/1998 | Pearson et al. |
| 5,828,769 A | 10/1998 | Burns |
| 5,828,770 A | 10/1998 | Leis et al. |
| 5,835,622 A | 11/1998 | Koljonen et al. |
| 5,845,288 A | 12/1998 | Syeda-Mahmood |
| 5,848,184 A | 12/1998 | Taylor et al. |
| 5,848,189 A | 12/1998 | Pearson et al. |
| 5,850,466 A | 12/1998 | Schott et al. |
| 5,850,469 A | 12/1998 | Martin et al. |
| 5,859,923 A | 1/1999 | Petry, III et al. |
| 5,862,245 A | 1/1999 | Renouard et al. |
| 5,864,779 A | 1/1999 | Fujimoto |
| 5,871,018 A | 2/1999 | Delp et al. |
| 5,875,040 A | 2/1999 | Matraszek et al. |
| 5,881,170 A | 3/1999 | Araki et al. |
| 5,890,808 A | 4/1999 | Neff et al. |
| 5,912,984 A | 6/1999 | Michael et al. |
| 5,912,985 A | 6/1999 | Morimoto et al. |
| 5,917,733 A | 6/1999 | Bangham |
| 5,926,568 A | 7/1999 | Chaney et al. |
| 5,930,391 A | 7/1999 | Kinjo |
| 5,933,516 A | 8/1999 | Tu et al. |
| 5,933,523 A | 8/1999 | Drisko et al. |
| 5,937,084 A | 8/1999 | Crabtree et al. |
| 5,940,535 A | 8/1999 | Huang |
| 5,943,442 A | 8/1999 | Tanaka et al. |
| 5,950,158 A | 9/1999 | Wang |
| 5,974,169 A | 10/1999 | Bachelder |
| 5,974,365 A | 10/1999 | Mitchell |
| 5,982,475 A | 11/1999 | Bruning |
| 5,995,648 A | 11/1999 | Drisko et al. |
| 5,995,953 A | 11/1999 | Rindtorff et al. |
| 6,002,793 A | 12/1999 | Silver et al. |
| 6,005,978 A | 12/1999 | Garakani |
| 6,021,220 A | 2/2000 | Anderholm |
| 6,023,530 A | 2/2000 | Wilson |

| | | |
|---|---|---|
| 6,026,186 A | 2/2000 | Fan |
| 6,026,359 A | 2/2000 | Yamaguchi et al. |
| 6,035,066 A | 3/2000 | Michael |
| 6,052,489 A | 4/2000 | Sakaue |
| 6,061,086 A | 5/2000 | Reimer et al. |
| 6,064,958 A | 5/2000 | Takahashi et al. |
| 6,067,379 A | 5/2000 | Silver |
| 6,070,160 A | 5/2000 | Geary |
| 6,078,700 A | 6/2000 | Sarachik |
| 6,081,620 A | 6/2000 | Anderholm |
| 6,111,984 A | 8/2000 | Fukasawa |
| 6,115,052 A | 9/2000 | Freeman et al. |
| 6,122,399 A | 9/2000 | Moed |
| 6,128,405 A | 10/2000 | Fujii |
| 6,130,959 A | 10/2000 | Li |
| 6,137,893 A | 10/2000 | Michael et al. |
| 6,151,406 A | 11/2000 | Chang et al. |
| 6,154,566 A | 11/2000 | Mine et al. |
| 6,154,567 A | 11/2000 | McGarry |
| 6,173,066 B1 | 1/2001 | Peurach et al. |
| 6,173,070 B1 | 1/2001 | Michael et al. |
| 6,178,261 B1 | 1/2001 | Williams et al. |
| 6,178,262 B1 | 1/2001 | Picard |
| 6,215,915 B1 | 4/2001 | Reyzin |
| 6,226,418 B1 | 5/2001 | Miller et al. |
| 6,246,478 B1 | 6/2001 | Chapman et al. |
| 6,252,986 B1 | 6/2001 | Chang |
| 6,272,244 B1 | 8/2001 | Takahashi et al. |
| 6,272,245 B1 | 8/2001 | Lin |
| 6,311,173 B1 | 10/2001 | Levin |
| 6,324,298 B1 | 11/2001 | O'Dell et al. |
| 6,324,299 B1 | 11/2001 | Sarachik et al. |
| 6,327,393 B1 | 12/2001 | Bruder |
| 6,345,106 B1 | 2/2002 | Borer |
| 6,363,173 B1 | 3/2002 | Stentz et al. |
| 6,381,375 B1 | 4/2002 | Reyzin |
| 6,385,340 B1 | 5/2002 | Wilson |
| 6,408,109 B1 | 6/2002 | Silver et al. |
| 6,411,734 B1 | 6/2002 | Bachelder |
| 6,421,458 B2 | 7/2002 | Michael et al. |
| 6,424,734 B1 | 7/2002 | Roberts et al. |
| 6,453,069 B1 | 9/2002 | Matsugu et al. |
| 6,457,032 B1 | 9/2002 | Silver |
| 6,462,751 B1 | 10/2002 | Felser et al. |
| 6,466,923 B1 | 10/2002 | Young et al. |
| 6,516,092 B1 | 2/2003 | Bachelder |
| 6,529,852 B2 | 3/2003 | Knoll et al. |
| 6,532,301 B1 | 3/2003 | Krumm et al. |
| 6,563,324 B1 | 5/2003 | Nichani |
| 6,614,926 B1 | 9/2003 | Fix et al. |
| 6,625,303 B1 | 9/2003 | Young et al. |
| 6,636,634 B2 * | 10/2003 | Melikian et al. ............... 382/217 |
| 6,639,624 B1 | 10/2003 | Bachelder et al. |
| 6,658,145 B1 | 12/2003 | Silver et al. |
| 6,681,039 B1 | 1/2004 | Roberts et al. |
| 6,690,842 B1 | 2/2004 | Silver et al. |
| 6,691,126 B1 | 2/2004 | Syeda-Mahmood |
| 6,691,145 B1 | 2/2004 | Shibata et al. |
| 6,748,104 B1 | 6/2004 | Bachelder et al. |
| 6,760,483 B1 | 7/2004 | Elichai et al. |
| 6,771,808 B1 | 8/2004 | Wallack |
| 6,785,419 B1 | 8/2004 | Jojic et al. |
| 6,850,646 B1 | 2/2005 | Silver |
| 6,856,698 B1 | 2/2005 | Silver et al. |
| 6,859,548 B2 | 2/2005 | Yoshioka et al. |
| 6,909,798 B1 | 6/2005 | Yukawa et al. |
| 6,959,112 B1 | 10/2005 | Wagman |
| 6,973,207 B1 | 12/2005 | Akopyan et al. |
| 6,993,177 B1 | 1/2006 | Bachelder |
| 7,016,539 B1 | 3/2006 | Silver et al. |
| 7,062,093 B2 | 6/2006 | Steger |
| 7,139,421 B1 | 11/2006 | Fix et al. |
| 7,190,834 B2 | 3/2007 | Davis |
| 7,239,929 B2 | 7/2007 | Ulrich et al. |
| 7,751,625 B2 | 7/2010 | Ulrich et al. |
| 2002/0054699 A1 | 5/2002 | Roesch et al. |
| 2004/0081346 A1 * | 4/2004 | Louden et al. ............... 382/141 |
| 2005/0117801 A1 | 6/2005 | Davis et al. |
| 2009/0096790 A1 | 4/2009 | Wiedemann et al. |
| 2009/0185715 A1 | 7/2009 | Hofhauser et al. |

FOREIGN PATENT DOCUMENTS

| | | |
|---|---|---|
| JP | 6378009 | 4/1988 |
| JP | 06-160047 | 6/1994 |
| JP | 3598651 | 12/2004 |
| WO | 97/18524 A2 | 5/1997 |

OTHER PUBLICATIONS

Gdalyahu Y et al.: Self-Organization in Vision: Stochastic Clustering for Image Segmentation, Perceptual Grouping, and Image Database Organization: IEEE Transactions on Pattern Analysis and Machine Intelligence, IEEE Inc. New York, vol. 23, No. 10, Oct. 2001, pp. 1053-1074.

Pauwels E J et al: Finding Salient Regions in Images—Nonparametric Clustering for Image Segmentation and Grouping Computer Vision and Image Understanding, Academic Press, San Diego, CA, vol. 75, No. 1-2, Jul. 1999, pp. 73-85.

Scanlon J. et al.: Graph-theoretic Algorithms for Image Segmentation, Circuits and Systems, 1999, ISCAS '99. Proceedings of the 1999 IEEE International Symposium, Orlando, FL, May 30, 1999, pp. 141-144.

Jianbo Shi et al: Normalized Cuts and Image Segmentation, Computer Vision and Pattern Recognition, 1997. Proceedings, 1997 IEEE Computer Society Conference, San Juan, Puerto Rico Jun. 17-19, 1997, pp. 731-737.

XIE X L et al. A new fuzzy clustering validity criterion and its application to color image segmentation, Proceedings of the International Symposium on Intelligent Control, Arlington, Aug. 13-15, 1991, pp. 463-468.

Mehrotra R et al: Feature-based retrieval of similar shapes, Proceeding of the International Conference on Data Engineering. Vienna, Apr. 19-23, 1993, pp. 108-115.

Cognex Corporation, Cognex MVS-8000 Series, CVL Vision Tools Guide, pp. 25-136, Release 5.4 590-6271, Natick, MA USA 2000.

Hoogs et al., "Model-Based Learning of Segmentations", IEEE, pp. 494-499 1996.

Medina-Mora, R., "An Incremental Programming Environment," IEEE *Transactions on Software Engineering*, Sep. 1981, pp. 472-482, vol. SE-7, No. 5, 1992.

Newman et al., "3D CAD-Based Inspection I: Coarse Verification", IEEE, pp. 49-52, 1992.

Ullman, S., "Aligning pictorial descriptions: An approach to object recognition, I: Approaches to Object Recognition," reprinted from *Cognition*, pp. 201-214, vol. 32, No. 3, Cambridge, MA USA, Aug. 1989.

Belongie, S., et al., "Shape Matching and Object Recognition Using Shape Contexts", *IEEE Transactions on Pattern Analysis and Machine Intelligence, IEEE Inc.* New York, vol. 24, No. 4, (Apr. 2003),509-522.

Bileschi, S., et al., "Advances in Component-based Face Detection", *Lecture notes in Computer Science*, Springer Verlag, New York, NY, vol. 2388, (2002),135-143.

Bookstein, F L., "Principal Warps: Thin-Plate Splines and the Decomposition of Deformations", *IEEE Transactions on pattern Analysis and Machine Intelligence, IEEE Inc.*, New York, vol. 11, No. 6,(Jun. 1, 1989).

Fitzpatrick, J.M., et al., "Handbook of Medical Imaging", *vol. 2: Medical Image Processing and Analysis*, SPIE Press, Bellingham, WA,(2000),447-513.

Ohm, Jens-Rainer, "Digitale Bildcodierung,", *Springer Verlag*, Berlin 217580, XP0002303066, Section 6.2 Bewegungschatzung,(1995).

Stockman, G, et al., "Matching images to models for registration and object detection via clustering", *IEEE Transaction of Pattern Analysis and Machine Intelligence, IEEE Inc.*, New York, vol. PAMI-4, No. 3,,(1982).

Wei, Wen, et al., "Recognition and Inspection of Two-Dimensional Industrial Parts Using Subpolygons", *Pattern Recognition*, Elsevier, Kidlington, GB, vol. 25, No. 12, (Dec. 1, 1992),1427-1434.

Zhang, Zhengyou, "Parameter estimation techniques: A tutorial with application to conic fitting", *Imag Vision Comput: Image and Vision computing; Elsevier Science Ltd*, Oxford England, vol. 15, No. 1,(Jan. 1, 1997).
Ballard, D. H., et al., "Generalizing the Hough Transform to Detect Arbitrary Shapes", *Pattern Recognition*, vol. 13, No. 2 Pergamon Press Ltd. UK,(1981), pp. 111-122.
Ballard, et al., "Searching Near and Approximate Location", *Section 4.2, Computer Vision*, (1982), pp. 121-131.
Brown, Lisa G., "A Survey of Image Registration Techniques", *ACM Computing Surveys*, vol. 24, No. 4 Association for Computing.Machinery,(1992), pp. 325-376.
Caelli, et al., "Fast Edge-Only Matching Techniques for Robot Pattern Recognition", *Computer Vision, Graphics and Image Processing 39*, Academic.Press, Inc., (1987), pp. 131-143.
Caelli, et al., "On the Minimum Number of Templates Required for Shift, Rotation and Size Invariant Pattern Recognition", *Pattern Recognition*, vol. 21,.No. 3, Pergamon Press plc, (1988), pp. 205-216.
"Cognex 2000/3000/4000 Vision Tools", *Cognex Corporation*, Chapter 2.Searching Revision 5.2 P/N 590-0103, (1992), pp. 1-68.
"Cognex 3000/4000/5000 Programmable Vision Engines, Vision Tools", *Chapter 1 Searching, Revision 7.4 590-1036*, (1996), pp. 1-68.
Ballard, et al., "The Hough Method For Curve Detection", *Section 4.3, Computer Vision*, (1982), pp. 121-131.
"Cognex 3000/4000/5000 Programmable Vision Engines, Vision Tools", *Chapter 14 Golden Template Comparision*, (1996), pp. 569-595.
"Apex Search Object Library Functions", *Cognex Corporation*, (1998).
"Apex Search Object", *acuWin version 1.5*, (1997), pp. 1-35.
"Apex Model Object", *Cognex Corporation*, acuWin version 1.5, (1997), pp. 1-17.
"Description of Sobel Search", *Cognex Corporation*, (1998).
Crouzil, et al., "A New Correlation Criterion Based on Gradient Fields Similarity", *Proceedings of the 13th International Conference on Pattern Recognition Volume I Track A*, Computer Vision, (1996), pp. 632-636.
Grimson, et al., "On the Sensitivity of the Hough Transform for Object Recognition", *IEEE Transactions on Pattern Analysis and Machine Intelligence*, vol. 12. No. 3, (1990), pp. 255-274.
Hsieh, et al., "Image Registration Using a New Edge-Based Approach", *Computer Vision and Image Understanding.*, vol. 67, No. 2, (1997), pp. 112-130.
Rosenfeld, et al., "Coarse-Fine Template Matching", *IEEE Transactions on Systems, Man, and Cybernetics*, (1997), pp. 104-107.
Tian, et al., "Algorithms for Subpixel Registration", *Computer Vision Graphics and Image Processing 35*, Academic Press, Inc., (1986), pp. 220-233.
Joseph, S. H., "Fast Optimal Pose Estimation for Matching in Two Dimensions", *Image Processing and its Applications, Fifth International Conference*, (1995).
Geiger, et al., "Dynamic Programming for Detecting, Tracking, an Matching Deformable contours", *IEEE* (1995), pp. 294-302.
Cootes, T. F., et al., "Active Shape Models—Their Training and Application", *Computer Vision and Image Understanding*, vol. 61, No. 1, (Jan. 1995), 38-59.
Borgefors, Gunilla, Hierarchical Chamfer Matching: A Parametric Edge Matching Algorithm, IEEE Transaction on Pattern Analysis and Mchine Intelligence, vol. 10, No. 6, Nov. 1988.
Huttenlocher, Daniel P., Comparing Images using the Hausdorff Distance, IEEE Transactions on Pattern Analysis and Machine Intelligence, vol. 15, No. 9, Sep. 1993.
Wallack, Aaron S., Robust Algorithms for Object Localization, International Journal of Computer Vision, 243-262, May 1998.
Perkins, W.A., Inspector: A Computer Vision System that learns to Inspect Parts, IEEE Transactions on Pattern Analysis and Machine Vision Intelligence, vol. PAMI-5, No. 6, Nov. 1983.
Prosecution History of U.S. Patent No. 7,190,834.
Christian Balkenius and Lars Kopp, Elastic Template Matching as a Basis for Visual Landmark Recognition and Spatial Navigation, AISB workshop on "Spatial Reasoning in Mobile Robots and Animals", Jul. 1997, pp. 1-10.

Charles F. Neveu, Charles R. Dyer and Roland T. Chin, Two-Dimensional Object Recognition Using Multiresolution Models, Computer Vision, Graphics, and Image Processing, 1986, pp. 52-65.
Dario Maio and Davide Maltoni, Real-time face location on Gray-Scale Static Images, Pattern Recognition: The Journal of the Pattern Recognition Society, 2000, pp. 1525-1539.
Alexa Hauck, Stefan Lanser and Christoph Zierl, Hierarchical Recognition of Articulated Objects from Single Perspective Views, pp. 1-7. 1997.
Martin Bichsel, Strategies of Robust Object Recognition for the Automatic Identification of Human Faces, 1991, pp. 1-157.
D.M. Gavrila and L.S. Davis, 3-D Model-Based Tracking of Human Upper Body Movement: A Multi-View Approach, Computer Vision Laboratory, 1995, pp. 253-258.
T. Sakai, M. Nagao and S. Fujibayashi, Line Extraction and Pattern Detection in a Photograph, Pattern Recognition, 1969, pp. 233-248, vol. 1.
P. Seitz, G.K. Lang, B. Gilliard and J.C. Pandazis, The Robust Recognition of Traffic Signs From a Moving Car, pp. 287-294. 1991.
W. Eric and L. Grimson, On the Recognition of Parameterized 2D Objects, International Journal of Computer Vision, 1988, Kluwer Academic Publishers, Boston, MA, pp. 353-372.
Graham K. Lang and Peter Seitz, Robust Classification of Arbitrary Object Classes Based on Hierarchical Spatial Feature-Matching, Machine Vision and Applications, 1997, pp. 123-135.
D.M. Gavrila and L.S. Davis, 3-D Model-Based Tracking of Humans in Action: A Multi-View Approach, Computer Vision Laboratory, 1996, pp. 73-80.
Daniel Tretter, Charles A. Bouman, Khalid W. Khawaja and Anthony A. Maciejewski, A Multiscale Stochastic Image Model for Automated Inspection, IEEE Transactions on Image Processing, Dec. 1995, pp. 1641-1654, vol. 4, No. 12.
Request for Inter Partes, Reexamination of U.S. Patent 7,190,834 with claim chart exhibits, P-Z, Apr. 24, 2009.
Ulrich, Markus, Hierarchical Real-Time Recognition of Compound Objects in Images, Dissertationen, Verlag der Bayerischen Akademie der Wissenschaften in Kommission beim Verlag C. H. Beck, 2003.
Order Granting/Denying Request for Inter Partes Reexamination, Control No. 95/001,180, Aug. 28, 2009.
Brief on Appeal, Third party in interest, requester, MVTec Software, GmbH, dated Jun. 23, 2010.
Corrected Brief on Appeal, Third party in interest, requester, MVTec Software, GmbH, dated Jul. 13, 2010.
Respondent Brief in Inter Partes Reexamination, Control No. 95/001,180, dated Jul. 23, 2010.
Action closing prosecution, Control No. 95/001,180, dated Dec. 23, 2009.
Cox, et al, Predicting and Estimating the Accuracy of a Subpixel Registration Algorithm, IEEE Transactions on Pattern Analysis and Machine Intelligence, vol. 12, No. 8, Aug. 1990.
Feldmar, et al, 3D-2D Projective Registration of Free-Form Curves and Surfaces, Computer Vision and Image Understanding, vol. 65, No. 3, 403-424, Mar. 1997.
Gennery, Donald B., Visual Tracking of Known Three-Dimensional Objects, International Journal of Computer Vision Ref. pp. 243-270, 1992.
Jain, et al, Object Matching Using Deformable Templates, IEEE Transactions on Pattern Analysis and Machine Intelligence, vol. 18, No. 3, Ref. pp. 267-278, Mar. 1996.
Lu, Shape Registration Using Optimization for Mobile Robot Navigation, Department of Computer Science, University of Toronto, Ref. pp. 1-163, Publication Date 1995.
Wells, et al, Statistical Object Recognition, Submitted to the Department of Electrical Engineering and Computer Science Ref. pp. 1-177, Publication Date Nov. 24, 1992.
Zhang, et al, Iterative Point Matching for Registration of Free-Form Curves, 1-42, 2004.
Paul E. Anuta, Spatial Registration of Multispectral and Multitemporal Digital Imagery Using Fast Fourier Transform Techniques, IEEE Transactions on Geoscience Electronics, Oct. 1970, pp. 353-368, vol. GE-8, No. 4.
William K. Pratt, Digital Image Processing, Sun Microsystems, Inc. pp. 651-673.

Peter Seitz, Using Local Orientational Information as Image Primitive for Robust Object Recognition, Visual Communications and Image Processing IV, 1989, pp. 1630-1639, vol. 1199.

Richard Han and Avideh Zakhor, An Edge-Based Block Matching Technique for Video Motion, Image Processing Algorithms and Techniques II, 1991, pp. 395-408, vol. 1452.

Clark F. Olson and Daniel P. Huttenlocher, Automatic Target Recognition by Matching Oriented Edge Pixels, IEEE Transactions on Image Processing, Jan. 1997, pp. 103-113, vol. 6, No. 1.

Manabu Hashimoto, Kazuhiko Sumi, Yoshikazu Sakaue and Shinjiro Kawato, High-Speed Template Matching Algorithm Using information of Contour Points, Systems and Computers in Japan, 1992, pp. 78-87, vol. 23, No. 9.

Hiromitsu Yamada, Map Matching-Elastic Shape Matching by Multi-Angled Parallelism, Apr. 1990, pp. 553-561, vol. J73-D-II, No. 4.

MvTec's Responses to Complaint and Notice of Investigation, US International Trade Commission, Investigation No. 377-TA-680, pp. 1-42 of Public Version, Sep. 3, 2009.

MvTec LLC and MvTec Software's Answer and Counterclaims, US District Court for the District of Massachusetts, C.A. No. 1:08-cv-10857 JLY, filed Aug. 8, 2008.

Alexander, et al., "The Registration of MR Images Using Multiscale Robust Methods", Magnetic Resonance Imaging, vol. 14. No. 5, pp. 453-468 (1996).

Anisimov, V. et al., "Fast hierarchical matching of an arbitrarily oriented template", Pattern Recognition Letters, vol. 14, No. 2, pp. 95-101 (1993).

Araujo, H. et al., "A fully projective formulation of Lowe's Tracking Algorithm," Technical Report 641, Computer Science Department, University of Rochester (1996).

Ashburner, J., et al., "Incorporating Prior Knowledge into Image Registration," Neuroimage, vol. 6, No. 4, pp. 244-352 (1997).

Ashburner, J., et al., "Nonlinear Spatial Normalization using basis functions," Human Brain Mapping, vol. 7, No. 4., pp. 254-266 (1999).

Ashburner, J., et al., "Nonlinear Spatial Normalization using basis functions," The Wellcome Depart. of Cognitive Neurology, Institution of Neurology, Queen Square, London, UK, pp. 1-34, 1999.

Bachelder, I, et al., "Contour Matching Using Local Affine Transformations," Massachusetts Institute of Technology Artificail Intelligence Laboratory, A.I. Memo No. 1326 (Apr. 1992).

Baker, J., "Multiresolution Statistical Object Recognition," Master's thesis, Massachusetts Institute of Technology (1994).

Baker, J., et al. "Mulitresolution Statistical Object Recognition," Artificial Intelligence Laboratory, Massachusetts Institute of Technology, pp. 1-6.

Balkenius. C. et al., "Elastic Template Matching as a Basis for Visual Landmark Recognition and Spatial Navigation," Lund University Cognitive Science, 1997, pp. 1-10.

Balkenius. C. et al., "The XT-1 vision Architecture," Symposium on Image Analysis, Lund University Cognitive science, 1996, pp. 1-5, 1996.

Besl, P. et al., A Method for Registration of 3-D Shapes, IEEE Transactions on Pattern Analysis and Machine Intelligence, Feb. 1992, pp. 239-256, vol. 14, No. 2.

Bishsel, M. et al. "Strategies of Robust Object Recognition for the Automatic Identification of Human Faces," (1991), pp. 1-157, PhD thesis, ETH, Zurich.

Blais, G., et al., "Registering Multiview Range Data to Create 3D Computer Objects," IEEE Transactions on Pattern Analysis and Machine Intelligence, vol. 17, Nol 8, pp. 820-824 (Aug. 1995).

Breuel, T, "Geometric Aspects of Visual Object Recognition," Technical Report 1374, MIT Artificial Intelligence Laboratory, May, 1992, pp. 1-173.

Bruckstein, Alfred M., and Larry O'Gorman and Alon Orlitsky, "Design of Shapes for Precise Image Registration," IEEE Transactions on Information Theory, vol. 44, No. 7 Nov. 1998.

Dai, Xiaolong, A Feature-Based Image Registration Algorithm Using Improved Chain-Code Representation Combined with Invariant Moments, IEEE Transactions on Geoscience and Remote Sensing, vol. 37, No. 5, Sep. 1999.

Chiou-Ting Hsu, et al., Multiresolution Feature-Based Image Registration, In Visual Communications and Image Processing 2000, Proceedings of SPIE vol. 4067 (2000), pp. 1490-1498, Perth, Australia, Jun. 20-23, 2000.

Chen, Y. et al. "Object Modeling by Registration of Multiple Range Images," in IEEE ICRA, pp. 2724-2729 (1991).

Chen, Y. et al. "Object Modeling registration of multiple range images," Image and Vision Computing, vol. 10, No. 3, pp. 145-155 (1992).

Cognex Corporation, "Chapter 7 CONLPAS," Cognex 3000/4000/5000 Programmable Vision Engines, Vision Tools, Revision 7.4, P/N 590-0136, pp. 307-340 (1996).

Cognex Corporation, Cognex 3000/4000/5000 Vision Tool, Revision 7.6, Chapter 4, Caliper Tool, 1996.

Cognex Corporation, Cognex 3000/4000/5000 Vision Tool, Revision 7.6, Chapter 5, Inspection, 1996.

Cognex Corporation, Cognex 3000/4400 SMD Tools Release 5.2, SMD 2, 1994.

Cognex Corporation, Cognex 4000/5000 SMD Placement Guidance Package, User's Manual Release 3.8.00, 1998.

Cognex Corporation, Cogness MVS-8000 Series, CVL Vision Tools Guide, pp. 25-136, Release 5.4 590-6271, Natick, MA USA 2000.

Cognex Corporation, Cognex MVS-8000 Series, GDE User's Guide, Revision 1.1, Apr. 7, 2000.

Cox, I. et al., "On the Congruence of Noisy Images to Line Segment Models," International Conference on Computer Vision, pp. 252-258 (1988).

Cox, I. et al., "Predicting and Estimating the Accuracy of a Subpixel Registration Algorithm," IEEE Transactions on Pattern Analysis and Machine Intelligence, vol. 12, No. 8, pp. 721-734 (Aug. 1990).

Dana, K. et al. Registration of Visible and Infrared Images, pp. 1-12, vol. 1957.

Declerck, J. et al. "Automatic Registration and Alignment on a Template of Cardiac Stress & Rest SPECT Images," IEEE Proc. of MMBIA 1996, pp. 212-221.

DeFigueiredo et al. Model Based Orientation Independent 3-D Machine Vision Techniques, IEEE Transactions on Aerospace and Electronic Systems, vol. 24, No. 5 Sep. 1988, pp. 597-607.

Dementhon, D. et al. "Model-Based Object Pose in 25 Lines of Code," Proceedings of the Second European Conference on Computer Vision, pp. 335-343 (1992).

Dementhon, D. F. et al. Model-BAsed Object Pose in 25 Lines of Code, International Journal of Computer Vision, 1995, pp. 123-141, Kluwer Academic Publishers, Boston, MA.

Devernay, F., "A Non-Maxima Suppression Method for Edge Detection with Sub-Pixel Accuracy," Institut National de Recherche en Informatique et en Automatique, No. 2724, Nov. 1995, 24 pages.

Dorai, C. et al. "Optimal Registration of Multiple Range View," IEEE 1994, pp. 569-571.

Drewniok, C. et al. "High-Precision Localization of Circular Landmarks in Aerial Images," Proc. 17, DAGM-Sumposium, Mustererkennung 1995, Bielefeld, Germany, Sep. 13-15, 1995, pp. 594-601.

Eric, W. et al., On the Recognition of Parameterized 2D Objects, International Journal of Computer Vision, 1988, Kluwer Academic Publishers, Boston, MA, pp. 353-372.

Feddema, J. T. et al. Weighted Selection of Image Features for Resolved Rate Visual Feedback Control, IEEE Transaction of Robitics and Automation, vol. 7 No. 1, Feb. 1991, pp. 31-47.

Feldmar, J. et al. "3D-2D projective registration of free-form curves and surfaces," Institut National de Recherche en Informatique et en Automatique, No. 2434, Dec. 1994, 47 pages.

Fischer, Andre, and Thomas Kolbe and Felicitas Lang, On the Use of Geometric and Semantic Models for Component-Based Building Reconstruction: Institute for Photogrammetry, University of Bonn, pp. 101-119, 1999.

Foley, James D., Andries Van Dam, Steven K. Feiner, John F. Hughes, "Second Edition in C, Computer Graphics Principles and Practice," pp. 48-51, Addison-Wesley Publishing Company, 1996, USA.

Foley, J. D, et al., "Introduction to Computer Graphics," pp. 36-49 (1994).

Forsyth, D. et al., "Invariant Descriptors for 3-D Object Recognition and Pose," IEEE Transactions on Pattern Analysis and Machine Intelligence, vol. 13, No. 10, Oct. 1991, pp. 971-991.

Foster, Nigel J., "Determining objection orientation using ellipse fitting," SPIE vol. 521—Intelligent Robots and Computer Vision, 1985, pp. 34-43.

Foster, Nigel J., et al., "Determining objection orientation from a single image using multiple information sources," CMU-RI-TR-84-15, Jun. 1984, pp. 1-96.

Foster, Nigel J., "Attributed Image Matching Using a Minimum Representation Size Criterion," PhD. Thesis, Carnegie Mellon University, 1987, pp. 1-142.

Gavrila et al. "3-D Model-Based Tracking of Humans in Action: A Multi-View Approach," Computer Vision Laboratory, 1996, pp. 73-80.

Gavrila, D. et al. "3-D Model-Based Tracking of Human Upper Body Movement: A Multi-View Approach," Computer Vision Laboratory, 1995, pp. 253-258.

Ge, Y. et al. "Surface-based 3-D image registration using the Iterative Closest Point algorithm with a closest point transform," Medical Imaging 1996: Image Processing, M. Loew, K. Hanson, Editors, Proc. SPIE 2710, pp. 358-367 (1996).

Gennery, D. "Visual Tracking of Known Three-Dimensional Objects," International Journal of Computer Vision, vol. 7, No. 3, pp. 243-270 (1992).

Gorman, "Recognition of incomplete polygonal objects", IEEE, pp. 518-522, 1989.

Gottesfeld Brown, L. M. et al. "Registration of Planar Film Radiographs with Computed Tomography," 1996 Workshop on Mathematical Methods in Biomedical Image Analysis (MMBIA '96), pp. 42-51 (1996).

Haag, M. et al. Combination of Edge Element and Optical Flow Estimates for 3D-Model Based Vehicle Tracking in Traffic Images Sequences, International Journal of Computer Vision, 1999, pp. 295-319.

Han, R. et al., An Edge-Based Block Matching Technique for Video Motion, Image Processing Algorithms and Techniques II, 1991, pp. 395-408, vol. 1452.

Haralick, R., et al., "Pose Estimation from Corresponding Point Data," IEEE Trans. On Systems, Man and Cybernetics, vol. 19, No. 6, pp. 1426-1445, 1989.

Hashimoto et al. M., "High-Speed Template Matching Algorithm Using Contour Information," Proc. SPIE, vol. 1657, pp. 374-385 (1992).

Hashimoto, M. et al. "An Edge Point Template Matching Method for High Speed Difference Detection between Similar Images," Industrial Electronics and Systems Development Laboratory Mitsubishi Electric Corp., PRU, vol. 90, No. 3, (1990), 8 pages.

Hashimoto, M. et al. "High Speed Template Matching Algorithm Using Information of Edge Points," Trans. IEICE Technical Report D-II, vol. J74-D-II, No. 10, pp. 1419-1427 (Oct. 1991).

Hashimoto, M. et al., "High-Speed Template Matching Algorithm Using Information of Contour Points," Systems & Computers in Japan, vol. 23, No. 9, pp. 78-87 (1992).

Havelock, David I., "Geometric Precision in Noise-Fee Digital Images," IEEE Transactions on Pattern Analysis and Machine Intelligence, vol. II, No. 10, Oct. 1989.

Hill, John W., Machine Intelligence Research Applied to Industrial Automation, U.S. Department of Commerce, National Technical Information Service, SRI International Tenth Report, Nov. 1980.

Hill et al., "Medical Image Registration," Institute of Physics Publishing; Phys. Med. Biol. 46 (2001), pp. R1-R45.

Hill, D. et al., "Voxel Similarity Measures for Automated Image Registration," Proc. SPIE, vol. 2359, pp. 205-216 (1994).

Hirako, K. "Development of an automated detection system for microcalcifications lesion in mammography" Trans. IEICE japan D-II, vol. J78-D-II, No. 9, pp. 1334-1343 (Sep. 1995).

Hirooka, M. et al., "Hierarchical distributed template matching," Proc. SPIE vol. 3029, p. 176-183 (1997).

Hoff, W.A., et al. "Pose Estimation of Artificial Knee Implants in Fluoroscopy Images Using a Template Matching Technique," Proc. of 3$^{rd}$ IEEE Workshop on Applications of Computer Vision, Dec. 2-4, 1996, 7 pages.

Holden, M. et al. "Voxel Similarity Measures for 3-D Serial MR Brian Image Registration," IEEE Transactions on Medical Imaging, vol. 19, No. 2, pp. 94-102 (2000).

Hoogs, Anthony and Ruzena Bajesy, Model-based Learning of Segmentations, pp. 494-499, IEEE, 1996.

Hu, et al, "Expanding the Range of Convergence of the CORDIC Algorithm," IEEE Transactions on Computers, vol. 40, No. 1, pp. 13-21 (Jan. 1991).

Hu, Y., "CORDIC-Based VLSI Architectures for Digital Signal Processing," IEEE Signal Processing Magazine, pp. 16-35, 1053-5888/92 (Jul. 1992).

Hugli, et al. "Geometric matching of 3D objects assessing the range of successful initial configurations", IEEE, pp. 101-106, 1997.

Hung, D. et al. "Subpixel Edge Estimation Using Geometrical Edge Models with Noise Miniaturization," 1994, pp. 112-117.

Hutchinson, Seth, and Greg Hager and Peter Corke, "A Tutorial on Visual Servo Control," IEEE Transactions on Robotics and Automation, vol. 12, No. 5, Oct. 1996, 20 pages.

Huttenlocher, D. F. er al., "A Multi-Resolution Technique for Comparing Images Using the Hausdorff Distance," 1993 IEEE, pp. 705-706.

Jacobs, D.W., The Use of Grouping in Visual Object Recognition, MIT Artificial Intelligence Laboratory, Office of Naval Research, pp. 1-162, Oct. 1988.

Jähne, B. et al. Geißler, Handbook of Computer Vision and Applications, vol. 2, Academic Press, (1999), Chapter 5, 43 pages.

Jain, A. K. et al. "Object Matching Using Deformable Templates, IEEE Transactions on Pattern Analysis and Machine Intelligence," Mar. 1996, pp. 267-278, vol. 18, No. 3.

Jain, R. et al., "Machine Vision," McGraw-Hill, 1995, 207 pages.

Jebara, T.S., 3D Pose Estimation and Normalization for Face Recognition, Undergraduate Thesis, Department of. Electrical Engineering, McGrill University May 1996, 138 pages.

Jiang, H. et al., "A New Approach to 3-D Registration of Multimodality Medical Images by Surface Matching," SPIE vol. 1808, pp. 196-213 (1992).

Jiang, H. et al., "Image Registration of Multimodality 3-D Medical Images by Chamfer Matching," Biomedical Image Processing and Three Dimensional Microscopy, SPIE vol. 1660, pp. 356-366 (1992).

Jokinen, O. "Building 3-D City Models from Multiple Unregistered Profile Maps," First International Conference on Recent Advances in 3-D Digital Imaging and Modeling, pp. 242-249 (1997).

Jokinen, O. "Matching and modeling of multiple 3-D disparity and profile maps," Ph.D Thesis, Helsinki Univ. of Technology, Helsinki, Finland (2000).

Jokinen, O., Area-Based Matching for Simultaneous Registration of Multiple 3-D Profile Maps, CVIU, vol. 71, No. 3, pp. 431-447 (Sep. 1998).

Jordan, J. "Alignment mark detection using signed-contrast gradient edge maps," Proc. SPIE, vol. 1661, pp. 396-407 (1992).

Kawamura, et al. "On-Line Recognition of Freely Handwritten Japanese Characters Using Directional Feature Densities", IEE, pp. 183-186, 1992.

Kersten, T. et al., "Automatic Interior Orientation of Digital Aerial Images," Photogrammetric Engineering & Remote Sensing, vol. 63, No. 8, pp. 1007-1011 (1997).

Kersten, T. et al. "Experiences with Semi-Automatic Aertriangulation on Digital Photogrammetric Stations," Great Lakes Conference on Digital Photogrammetry and Remote Sensing (1995).

Koller, D. et al. "Model-Based Object Tracking in Monocular Image Sequences of Road Traffic Scenes, International Journal of Computer Vision," 1993, pp. 257-281.

Kollnig, H. et al., 3D Post Estimation by Fitting Image Gradients Directly to Polyhedral Models, IEEE, 1995, pp. 569-574.

Kollnig, H. et al., 3D Post Estimation by Directly Matching Polyhedral Models to Gray Value Gradients, International Journal Computer Vision, 1997, pp. 283-302.

Kovalev et al., "An Energy Minimization Approach to the Registration, Matching and Recognition of Images," Lecture Notes In Computer Science, vol. 1296, Proceedings of the 7th International Conference on Computer Analysis of Images and Patterns, pp. 613-620 (1997).

Lamdan, Y. et al., Affine Invariant Model-Based Object Recognition, IEEE Transactions on Robotics and Automation, Oct. 1990, pp. 578-589, vol. 6, No. 5.

Lang, G. K. et al. Robust Classification of Arbitraty Object Classes Based on Hierarchical Spatial Feature-Matching, Machine Vision and Applications, 1997, pp. 123-135.

Lemieux, L. et al., "A Patient-to-Computer-Tomography Image Registration Method Based on Digitally Reconstructed Radiographs," Med. Phys., vol. 21, No. 11, pp. 1749-1760 (Nov. 1994).

Li, H. et al. A Contour-Based Approach to Multisensor Image Registration, IEEE Transactions on Image Processing, Mar. 1995, pp. 320-334, vol. 4, No. 3.

Li, Z. et al., On Edge Preservation in Multiresolution Images, Graphical Models and Image Processing, 1992, pp. 461-472, vol. 54, No. 6.

Lindeberg, T. Discrete Derivative Approximations with Scale-Space Properties: A Basis for Low-Level Feature Extraction, Journal of Mathematical Imaging and Vision, 1993, pp. 349-376.

Lu, F. Shape Registration Using Optimization for Mobile Robot Navigation, Department of Computer Science, University of Toronto, 1995, pp. 1-163.

Maes et al., "Multimodality Image Registration by Maximization of Mutual Information," IEEE Transactions on Medical Imaging, vol. 16, No. 2, Apr. 1997, pp. 187-198.

Maes, F. "Segmentation and Registration of Multimodal Medical Images," PhD thesis, Katholieke Universiteit Leuven (1998).

Maes, F. et al. "Comparative evaluation of multiresolution optimization strategies for multimodality image registration by mazimization of mutual information," Medical Image Analysis, vol. 3, No. 4, pp. 373-386 (1999).

Maio, D. et al. Real-time face location on Gray-Scale Static Images, Pattern Recognition, The Journal of the Pattern Recognition Society, 2000, pp. 1525-1539.

Makous, W., "Optimal Patterns for Alignment," Applied Optics, vol. 13, No. 3, Mar. 1974, 6 pages.

Marchand, E. et al., "A 2D-3D Model-Based Approach to Real-Time Visual Tracking," Institut National de Recherche en Informatique et en Automatique, No. 3920, Mar. 2000, 33 pages.

Masuda et al., "A Robust Method for Registration and Segmentation of Multiple Range Images," Computer Vision and Image Understanding, vol. 61, No. 3, May pp. 295-307 (1995).

Masuda, et al., "Detection of partial symmetry using correlation with rotatedreflected images," Pattern Recognition, vol. 26, No. 88, pp. 1245-1253 (1993).

Medina-Mora, R., "An Incremental Programming Environment," IEEE Transactions on Software Engineering, Sep. 1981, pp. 472-482, vol. SE-7, No. 5, 1992.

Meijering et al., "Image Registration for Digital Subtraction Angiography," International Journal of Computer Vision, vol. 31, No. 2, pp. 227-246 (1999).

Miller, et al. (Template Based Method Of Edge Linking Using a Weighted Decision), IEEE, pp. 1808-1815, 1993.

Neveu, C. F. et al. "Two-Dimensional Object Recognition Using Multiresolution Models, Computer Vision, Graphics, and Image Processing," 1986, pp. 52-65.

Newman, Timothy S., Anil K. Jain and H.R. Keshavan, "3D CAD-Based Inspection 1: Coarse Verification," IEEE, 1992, pp. 49-52.

O'Gorman, Lawrence, "Subpixel Precision of Straight-Edged Shapes for Registration and Measurement," IEEE Transactions on Pattern Analysis and Machine Intelligence, vol. 18, No. 7, Jul. 1996, 6 pages.

Oberkampf, D. et al., "Iterative Pose Estimation Using Coplanar Feature Points," Computer Vision and Image Understanding, vol. 63, No. 3, pp. 495-511 (1996).

Oberkampf, D. et al., "Iterative Pose Estimation Using Coplanar Points," International Conference on Computer Vision and Pattern Recognition, pp. 626-627 (1993).

Olson, C.F. et al. "Automatic Target Recognition by Matching Oriented Edge Pixels, IEEE Transactions on Image Processing," Jan. 1997, pp. 103-113, vol. 6, No. 1.

Olson, C.F. et al. "Recognition by matching dense, oriented edge pixels," in Proc. Int. Symp. Comput. Vision, pp. 91-96 (1995).

Perkins, W. A., "Inspector: A Computer Vision System That Learns to Inspect Parts," IEEE Transactions on Pattern Analysis and Machine Intelligence, Nov. 1983, pp. 584-592, vol. PAMI-5, No. 6.

Pluim et al., "Interpolation Artifacts in Mutual Information-Based Image Registration," Computer Vision and Image Understanding 77, 211-232 (2000).

Pluim, J. "Multi-Modality Matching Using Mutual Information," Master's thesis, Department of Computing Science, University of Groningen (1996).

Pluim, J. P. W., et al., "Mutual information matching and interpolation artefacts," Proc. SPIE. vol. 3661, (1999), 10 pages.

Rignot, E. et al. "Automated Multisensor Registration: Requirements and Techniques," Photogrammetric Engineering & Remote Sensing, vol. 57, No. 8, pp. 1029-1038 (1991).

Roche, A. et al. "Generalized Correlation Ratio for Rigid Registration of 3D Ultrasound with MR Images," Medical Image Computing and Computer-Assisted Intervention—MICCAI 2000, pp. 567-577 (2000).

Roche, A. et al. "Multimodal Image Registration by Maximization of the Correlation Ratio," Rapport de Récherche No. 3378, Unité de Recherche INRIA Sophia Antipolis, INRIA (Aug. 1998).

Roche, A. et al. "The Correlation Ratio as a New Similarity Measure for Multimodal Image Registration," Medical Image Computing and Computer-Assisted Intervention—MICCAI'98, pp. 1115-1124 (1998).

Rueckert, D. et al. "Nonrigid Registration Using Free-Form Deformations: Application to Breast MR Images," IEEE Transactions on Medical Imaging, vol. 18, No. 8, pp. 712-721 (1999).

Rueckert, D. et al., "Non-rigid Registration of Breast MR Images Using Mutual Information", Proceedings of the Medical Image Computing and Computer Assisted Intervention Society, pp. 1144-1152 (1998).

Rummel, P. et al., "Workpiece Recognition and Inspection by a Model-Based Scene Analysis System," Pattern Recognition, 1984, pp. 141-148, vol. 17, No. 1.

Sakai, T. et al., "Line Extraction and Pattern Detection in a Photograph," Pattern Recognition, 1969, pp. 233-248, vol. 1.

Sanderson, Arthur, and Nigel Foster, "Attributed Image Matching Using a Minimum Representation Size Criterion," IEEE 1989, pp. 360-365.

Schütz, H. et a., "Recognition of 3-D Objects with a Closest-Point Matching Algorithm," Proc. conference ISPRS intercommission workshop, vol. 30, issue 5WI (1995), 6 pages.

Seitz, P. "The robust recognition of object primitives using local axes of symmetry," Signal Processing, vol. 18, pp. 89-108 (1989).

Seitz, P., "Using Local Orientation Information as Image Primitive for Robust Object Recognition," Visual Communications and Image Processing IV, 1989, pp. 1630-1639, vol. 1199.

Shekhar, C. et al. "Multisensor image registration by feature consensus," Pattern Recognition, vol. 32, No. 1, pp. 39-52 (1999).

Steger, C. "An Unbiased Detector of Curvilinear Structures," Technische Universitat Munchen, Technical Report FGBV-96-03, Jul. 1996, 32 pages.

Stevens, M. R. et al. "Precise Matching of 3-D Target Models to Multisensor Data," IEEE Transactions on Image Processing, vol. 6, No. 1, Jan. 1997, pp. 126-142.

Stimets, R. W. et al., "Rapid Recognition of Object Outlines in Reduced Resolution Images," Pattern Recognition, 1986, pp. 21-33, vol. 19, No. 1.

Studholme et al., "An Overlap Invariant Entropy Measure of 3D Medical Image Alignment," Pattern Recognition, The Journal of the Pattern Recognition Society, Pattern Recognition 32, 71-86 (1999).

Studholme, C. "Measures of 3D Medical Image Alignment," PhD thesis, University of London (1997).

Suk, M. et al. "New Measures of Similarity Between Two Contours Based on Optimal Bivariate Transforms," Computer Vision, Graphics and Image Processing, 1984, pp. 168-182.

Tanaka, M. et al., "Picture Assembly Using a Hierarchical Partial-Matching Technique," IEEE Transactions on Systems, Man, and Cybernetics, vol. SMC-8, No. 11, pp. 812-819 (Nov. 1978).

Tanimoto, S. L., "Template Matching in Pyramids," Computer Graphics and Image Processing, vol. 16, pp. 356-369 (1981).

Thévenaz, P. et al. "Optimization of Mutual Information for Multiresolution Image Registration," IEEE Transactions on Image Processing, vol. 9, No. 12, pp. 2083-2099 (Dec. 2000).
Tretter, D. et al. "A Multiscale Stochastic Image Model for Automated Inspection," IEEE Transactions on Image Processing, Dec. 1995, pp. 1641-1654, vol. 4, No. 12.
Turk, G. et al. "Zippered Polygon Meshes from Range Images," SIGGRAPH/ACM 1994, 8 pages.
Ullman, S. et al., "Recognition by Linear Combinations of Models," A.I. Memo No. 1152, Massachusetts Institute of Technology Artificial Intelligence Laboratory, 1989, 43 pages.
Ullman, S., "Aligning pictorial descriptions: An approach to object recognition," Cognition, vol. 32, No. 3, pp. 193-154, Aug. 1989.
Umeyama, S., "Least-Squares Estimation of Transformation Parameters Between Two Point Patterns," IEEE Trans. on Pattern Analysis and Machine Intelligence, vol. 13, No. 2, pp. 119-152, 1994.
Valkenburg, R. J. et al., "An Evaluation of Subpixel Feature Localisation Methods for Precision Measurement," SPIE vol. 2350, 1994, 10 pages.
Van Herk, M. et al. "Automatic three-dimensional correlation of CT-CT, CTMRI, and CT-SPECT using chamfer matching,"Medical Physics, vol. 21, No. 7, pp. 1163-1178 (1994).
Wachter S. et al., "Tracking Persons in Monocular Image Sequences," Computer Vision and Image Understanding, vol. 74, No. 3, Jun. 1999, pp. 174-192.
Wallack, Aaron, "Algorithms and Techniques for Manufacturing," Ph.D. Thesis, University of California at Berkeley, 1995, Chapter 4, 93 pages.
Weese, J. et al. "Gray-Value Based Registration of CT and MR Images by Maximization of Local Correlation," Medical Image Computing and Computer-Assisted Intervention—MICCAI'98, pp. 656-664 (1998).
Wells et al., "Multi-modal Volume Registration by Maximization of Mutual Information," Medical Image Analysis (1996) vol. 1, No. 1, pp. 35-51.
Wells, W. "Statistical Approaches to Feature-Based Object Recognition," International Journal of Computer Vision, vol. 21, No. 1/2, pp. 63-98 (1997).
Wells, W., "Statistical Object Recognition," Ph.D. Thesis Submitted to the Massachusetts Institute of Technology, Department of Electrical Engineering and Computer Science, 1993, 177 pages.
White et al., "Two Methods of Image Extension," Computer Vision, Graphics, and Image Processing 50, 342-352 (1990).
Wilson, S. "Vector morphology and Iconic neural networks," IEEE Trans. Systems Man Cybernet., vol. 19, No. 6, pp. 1636-1644 (1989).
Wong, R. et al. "Sequential hierarchical scene matching," IEEE Trans. Comput., vol. C-27, pp. 359-366 (1978).
Wunsch, P. "Registration of CAD-Models to Images by Iterative Inverse Perspective Matching," pp. 553-561, vol. J73-D-II, No. 4.
Yamada, H. "Map Matching-Elastic Shape Matching by Multi-Angeled Parallelism," Apr. 1990, pp. 553-561, vol. J63-D-II, No. 4.
Zhang, Z., "Iterative Point Matching for Registration of Free-Form Curves," INRIA, Rapports de Recherche No. 1658, Programme 4, Robotique, Image et Vision, Unité De Recherche Inria-Sophia Antipolis (Mar. 1992).
Zhang, Z., "On Local Matching of Free-Form Curves," British Machine Vision Conference, pp. 347-356 (1992).
Zhang, Z. "Interative point matching for registration of free-form curves and surface," IJCV, vol. 13, No. 2, pp. 119-152 (1994).
Expert Report of David Forsyth Regarding Invalidity of U.S. Patent Nos. 7,016,539 and 7,065,262, *Certain Machine Vision Software, Machine Vision Systems, and Products Containing Same*, ICT Investigation No. 337-TA-680, Feb. 19, 2010.
Rebuttal Expert Report of Dr. Berthold K.P. Horn, *Certain Machine Vision Software, Machine Vision Systems, and Products Containing Same*, ICT Investigation No. 337-TA-680, Mar. 9, 2010.
Oct. 16, 2008 Amendment and Response, U.S. Appl. No. 11/023,177.
Oct. 16, 2008 Amendment and Response, U.S. Appl. No. 11/022,896.
Mar. 31, 2009 Amendment and Response, U.S. Appl. No. 11/022,896.
Oct. 29, 2009 Amendment and Response, U.S. Appl. No. 11/022,896.
Dec. 21, 2009 Amendment and Response, U.S. Appl. No. 11/022,896.
Apr. 10, 2009 Amendment and Response, U.S. Appl. No. 11/023,230.
Jan. 5, 2010 Amendment and Response, U.S. Appl. No. 11/023,230.
Jan. 22, 2009 Amendment and Response, U.S. Appl. No. 11/022,895.
Apr. 5, 2009 Amendment and Response, U.S. Appl. No. 11/022,895.
Nov. 13, 2009 Amendment and Response, U.S. Appl. No. 11/022,895.
Nov. 30, 2009 Amendment and Response, U.S. Appl. No. 11/022,895.
Dec. 31, 2008 Amendment and Response, U.S. Appl. No. 11/028,007.
Jun. 22, 2009 Amendment and Response, U.S. Appl. No. 11/028,007.
Dec. 29, 2009 Amendment and Response, U.S. Appl. No. 11/028,007.
Jan. 5, 2010 Amendment and Response, U.S. Appl. No. 11/029,116.
Jan. 22, 2009 Amendment and Response, U.S. Appl. No. 11/029,116.
Jul. 9, 2009 Amendment and Response, U.S. Appl. No. 11/029,116.
Jan. 5, 2010 Amendment and Response, U.S. Appl. No. 11/028,008.
Apr. 10, 2009 Amendment and Response, U.S. Appl. No. 11/028,008.
Jul. 30, 2008 Amendment and Response, U.S. Appl. No. 11/028,353.
Feb. 21, 2008 Amendment and Response, U.S. Appl. No. 11/028,353.
Feb. 25, 2009 Amendment and Response, U.S. Appl. No. 11/028,353.
Sep. 24, 2009 Amendment and Response, U.S. Appl. No. 11/028,353.
Jan. 2, 2009 Amendment and Response, U.S. Appl. No. 11/026,004.
Jul. 15, 2009 Amendment and Response, U.S. Appl. No. 11/026,004.
Mar. 2, 2009 Amendment and Response, U.S. Appl. No. 11/026,996.
Aug. 13, 2009 Amendment and Response, U.S. Appl. No. 11/026,003.
Mar. 19, 2009 Amendment and Response, U.S. Appl. No. 11/028,255.
Dec. 31, 2008 Amendment and Response, U.S. Appl. No. 11/027,962.
Nov. 3, 2009 Amendment and Response, U.S. Appl. No. 11/027,962.
Nov. 30, 2008 Amendment and Response, U.S. Appl. No. 11/027,962.
Apr. 7, 2009 Amendment and Response, U.S. Appl. No. 11/027,962.
Mar. 2, 2009 Amendment and Response, U.S. Appl. No. 11/027,963.
Mar. 2, 2009 Amendment and Response, U.S. Appl. No. 11/029,104.
Jul. 27, 2009 Amendment and Response, U.S. Appl. No. 11/029,104.
Oct. 19, 2007 Amendment and Response, U.S. Appl. No. 11/625,201.
May 31, 2007 Amendment and Response, U.S. Appl. No. 11/625,201.
Jun. 3, 2009 Amendment and Response, U.S. Appl. No. 11/625,201.
Jun. 30, 2008 Amendment and Response, U.S. Appl. No. 11/670,199.
Oct. 13, 2009 Amendment and Response, U.S. Appl. No. 11/670,199.
Apr. 29, 2009 Amendment and Response, U.S. Appl. No. 11/670,199.
Feb. 16, 2010 Appeal Brief, U.S. Appl. No. 10/949,530.
Dec. 27, 2007 Amendment and Response, U.S. Appl. No. 10/949,530.
Jun. 13, 2008 Amendment and Response, U.S. Appl. No. 10/949,530.
Feb. 6, 2009 Amendment and Response, U.S. Appl. No. 10/949,530.
Jul. 19, 2007 Amendment and Response, U.S. Appl. No. 10/949,530.
Feb. 2, 2008 Submission of Translation to German Patent Reference DE 4406020, U.S. Appl. No. 10/625,201.

* cited by examiner

METHOD FOR PARTITIONING A PATTERN INTO OPTIMIZED SUB-PATTERNS

FIELD OF THE INVENTION

This invention relates to machine vision systems, and particularly to methods for partitioning a machine vision image.

BACKGROUND OF THE INVENTION

Searching for a particular pattern in an image is a well-known problem in the art of machine vision, with many known solutions, such as feature-based search methods. Typically, the pattern is assumed to have undergone one or more of a few basic known transformations, such as having been scaled larger or smaller than the original pattern, or having been rotated. However, these known solutions often fail if the pattern has been deformed by being warped, pulled, bent, wrinkled, damaged, or otherwise fundamentally changed from the original pristine shape, or known transformations thereof, that the search method is adapted to find.

However, if the deformed pattern is broken down into smaller sub-patterns, those individual sub-patterns are themselves fairly similar to the corresponding parts of the original pattern bearing only minor deformation. For example, if the pattern has been bent into a "V" or boomerang shape, then the two legs of the boomerang both have good, easily found pieces of the pattern. Therefore, searching for a deformed pattern in an image may be facilitated by dividing the pattern into smaller sub-patterns, because for many typical types of deformation encountered, most of those sub-patterns can probably be found by known feature-based search methods because they are not themselves substantially distorted or deformed. Then, a subsequent algorithm can combine these partial results into a full match of the pattern.

The question is then how to divide the pattern into smaller sub-patterns. A human being can likely examine a large pattern, determine useful parts that will probably survive whatever deformation the image is expected to encounter, and divide it accordingly. However, automating the process is more difficult.

The obvious and standard way to automatically divide a pattern image into sub-patterns is to use a rectilinear grid, such as a tic-tac-toe grid or a checker board grid. Superimposing such a grid over the main pattern gives, for example, nine smaller sub-patterns. However, this method has significant drawbacks. Pattern matching is based on matching information in the source pattern with information in the target image. But useful information is not usually present uniformly throughout a pattern. Some of the sub-patterns selected with a grid may be blank, and consequently have no useful information contained therein. Some grid-based sub-patterns may have a small amount of information in one corner of the grid square and no information in the rest of it. And some may have a lot of dense information that would be more usefully split into smaller pieces. Further, grids divide the information of a pattern arbitrarily and indiscriminately. If, for example, part of the pattern is a small star, the grid lines might break that star up into two or even four parts, where a human operator would likely choose to keep the star together as one single, dense, easily found sub-pattern.

SUMMARY OF THE INVENTION

In one general aspect, the invention provides a method for partitioning a pattern into optimized sub-patterns. The method includes providing a list of features of the pattern, then generating a set of candidate partitions using the list of features of the pattern. Each candidate partition of the set of candidate partitions is then scored, and a best-scoring partition among the set of candidate partitions is determined based on the scoring of each candidate partition. Then, the best scoring partition is applied to the list of features so as to provide a plurality of sub-lists of features respectively representing a plurality of optimized sub-patterns.

In a preferred embodiment, providing a list of features includes using at least one sub-list from the plurality of sub-lists of features generated by an earlier application of the method as the list of features of the pattern. In another preferred embodiment, providing a list of features of the pattern includes providing an image, and extracting a list of features from the image. In a further preferred embodiment, extracting a list of features from the images includes sampling the image so as to provide a regular array of pixels. In an alternate embodiment, extracting a list of features from the images includes using an edge extraction method to provide an edge image, and sampling the edge image to provide a plurality of edge feature points. In a further preferred embodiment, each edge feature point includes the angle of the edge at that edge feature point.

In other preferred embodiments, features of the pattern are 2D image points. Alternatively, features of the pattern are points of any dimensionality.

In yet other embodiments, providing a list of features includes providing an abstract pattern description, and extracting a list of features from the abstract pattern description. In alternate preferred embodiments, providing a list of features includes providing a pre-generated list of features.

In another preferred embodiment, generating a set of candidate partitions using the list of features of the pattern includes using a clustering algorithm. In an alternate preferred embodiment, generating a set of candidate partitions using the list of features of the pattern includes using a spatial subdivision algorithm. In yet another embodiment, generating a set of candidate partitions using the list of features of the pattern includes using a method that yields sub-lists that include pattern features that span an area of the pattern that is spatially small with respect to the area of the entire pattern. In still another preferred embodiment, generating a set of candidate partitions using the list of features of the pattern includes using a method that provides sub-lists having pattern features that are more near to each other than to pattern features in other sub-lists. In a further preferred embodiment, generating a set of candidate partitions using the list of features of the pattern includes building a weighted graph using the list of features of the pattern, and partitioning the weighted graph to generate candidate partitions.

In a preferred embodiment, building a weighted graph using the list of features of the pattern includes fully connecting the feature points to make a graph, and assigning weights to each link. In an alternate preferred embodiment, building a weighted graph using the list of features of the pattern includes sparsely connecting the feature points to make a graph, and assigning weights to each link. In a further embodiment, the weight of each link is based on the distance between each pair of feature points. In other embodiments, weights decrease as the distance between feature points increases. In various other embodiments, the weights on each link are based on at least one of similarity of angle and similarity of magnitude. In yet other embodiments, the weights on each link are based on values associated with the feature points of the pattern. In still further embodiments, the weights on each link are determined such that larger weights represent a pair of features that tend to be together in the same sub-lists of features, and smaller weights indicate a pair of features that can be included in different sub-lists of features.

In some preferred embodiments, partitioning the weighted graph to generate candidate partitions includes dividing the weighted graph into two sub-graphs, one of which may be empty, and converting the two sub-graphs into two sub-lists of features. In other preferred embodiments, partitioning the weighted graph to generate candidate partitions includes partitioning the weighted graph using a "normalized cut" method to generate candidate partitions.

In a preferred embodiment, when generating a set of candidate partitions using the list of features of the pattern, at least one candidate partition has only a single sub-list of features of the pattern. In an alternate embodiment, when generating a set of candidate partitions using the list of features of the pattern, each candidate partition has many sub-lists of features of the pattern. In yet another alternate embodiment, when generating a set of candidate partitions using the list of features of the pattern, some features included in the list of features of the pattern do not appear on any sub-list of features of the pattern. In still another embodiment, when generating a set of candidate partitions using the list of features of the pattern, at least one feature of the pattern appears on a plurality of sub-lists of features of the pattern.

In more preferred embodiments, scoring each partition of the set of candidate partitions includes building sub-patterns using the set of candidate partitions, and scoring each candidate partition using a scoring function based on characteristics of a sub-pattern derived therefrom. In a further embodiment, characteristics of the sub-pattern includes spatial coherence of the features corresponding to the sub-pattern. In an alternate further embodiment, characteristics of the sub-pattern includes overall spatial size of the area spanned by the feature points corresponding to the sub-pattern. In a preferred embodiment, the area spanned by the feature points is represented by the smallest bounding box that includes all the feature points. In another embodiment, characteristics of the sub-pattern includes the number of feature points in the sub-pattern. In yet another embodiment, characteristics of the sub-pattern includes the total amount of weight in links "cut" by the partition algorithm to create the sub-pattern. In still another embodiment, characteristics of the sub-pattern includes the overall "suitability" of the sub-pattern used as a search pattern applied to the original pattern. In still other embodiments, characteristics of the sub-pattern includes spatial coherence of the features corresponding to the sub-pattern, overall spatial size of the area spanned by the feature points corresponding to the sub-pattern, the number of feature points in the sub-pattern, the total amount of weight in links "cut" by the partition algorithm to create the sub-pattern, and the overall "suitability" of the sub-pattern used as a search pattern applied to the original pattern.

In some preferred embodiments, the overall "suitability" of the sub-pattern used as a search pattern applied to the original pattern depends on the search algorithm used. In other preferred embodiments, the overall "suitability" of the sub-pattern used as a search pattern applied to the original pattern depends on degeneracy of the features of a sub-pattern. In yet other preferred embodiments, the overall "suitability" of the sub-pattern used as a search pattern applied to the original pattern depends on redundancy of the sub-pattern within the original pattern.

In a preferred embodiment, determining a best scoring partition based on the scoring includes using a partition score threshold. In some preferred embodiments, the partition score threshold is settable. In other preferred embodiments, the partition score threshold is predetermined. In yet other preferred embodiments, the partition score threshold includes a portion that is predetermined, and a portion that is settable. In a further embodiment, if no candidate partition has a score above the partition score threshold, then the list of features of the candidate partition is deemed to be one that cannot be usefully sub-divided.

In another general aspect, the invention provides a method for automatically extracting a plurality of sub-patterns from a pattern in an image, the method including extracting a plurality of features, building a connected graph using the plurality of features, and using the connected graph and a sub-division parameter to create a plurality of feature groups.

In another general aspect, the invention provides a method for dividing a pattern into a plurality of sub-patterns, each sub-pattern being adapted for use with an image search method that can provide a plurality of sub-pattern search results. In this aspect, the method includes representing the pattern as a plurality of feature points, generating candidate partitions of the plurality of feature points, scoring the candidate partitions by examining characteristics of each potential sub-pattern of each candidate partition, selecting the highest-scoring partition, and then applying it to the plurlaity of feature points so as to create one or more sub-pluralities of feature points. In a preferred embodiment, the sub-pluralities of feature points are used as sub-patterns by an image search method that is adapted to use pluralities of feature points. In another preferred embodiment, the characteristics of each potential sub-pattern of each candidate partition include area, number of feature points, and suitability of the sub-pattern for use with a particular search method.

The invention advantageously provides a plurality of sub-patterns where each sub-pattern contains a similar amount of information, where each sub-pattern has enough information to be located with a feature-based search method, and where that information has also been pre-evaluated as being useful and particularly adapted for running feature-based searches.

BRIEF DESCRIPTION OF THE DRAWING

The invention will be more fully understood by reference to the detailed description, in conjunction with the following figures, wherein:

FIG. 3b is a set of feature points resulting from an analysis of the sample image of FIG. 3a;

DETAILED DESCRIPTION

The method of the invention uses information present in the pattern itself as the basis for dividing the pattern into smaller parts called sub-patterns. Pattern information is discretized into "feature points," which are points in the pattern where there is some feature, such as an edge, that can be used to effectively find the pattern. Many search methods are already based on such feature points, such as feature-based search methods, some of which may also be called "geometric" search methods. These feature points are then associated in small groups based on proximity to each other and other factors explained below, but without regard to such artificial means as grid-lines. The result is a plurality of sub-patterns where each sub-pattern contains a similar amount of information, where each sub-pattern has enough information to be located with a feature-based search (typically based on approximately 12 to 30 feature points, at differing angles), and where that information has also been pre-evaluated as being useful and particularly adapted for running feature-based searches. Less than 12 feature points may not be enough information for known feature-based searches, and more than 30 feature points can be usefully subdivided into two smaller sub-groups.

Figure 2:
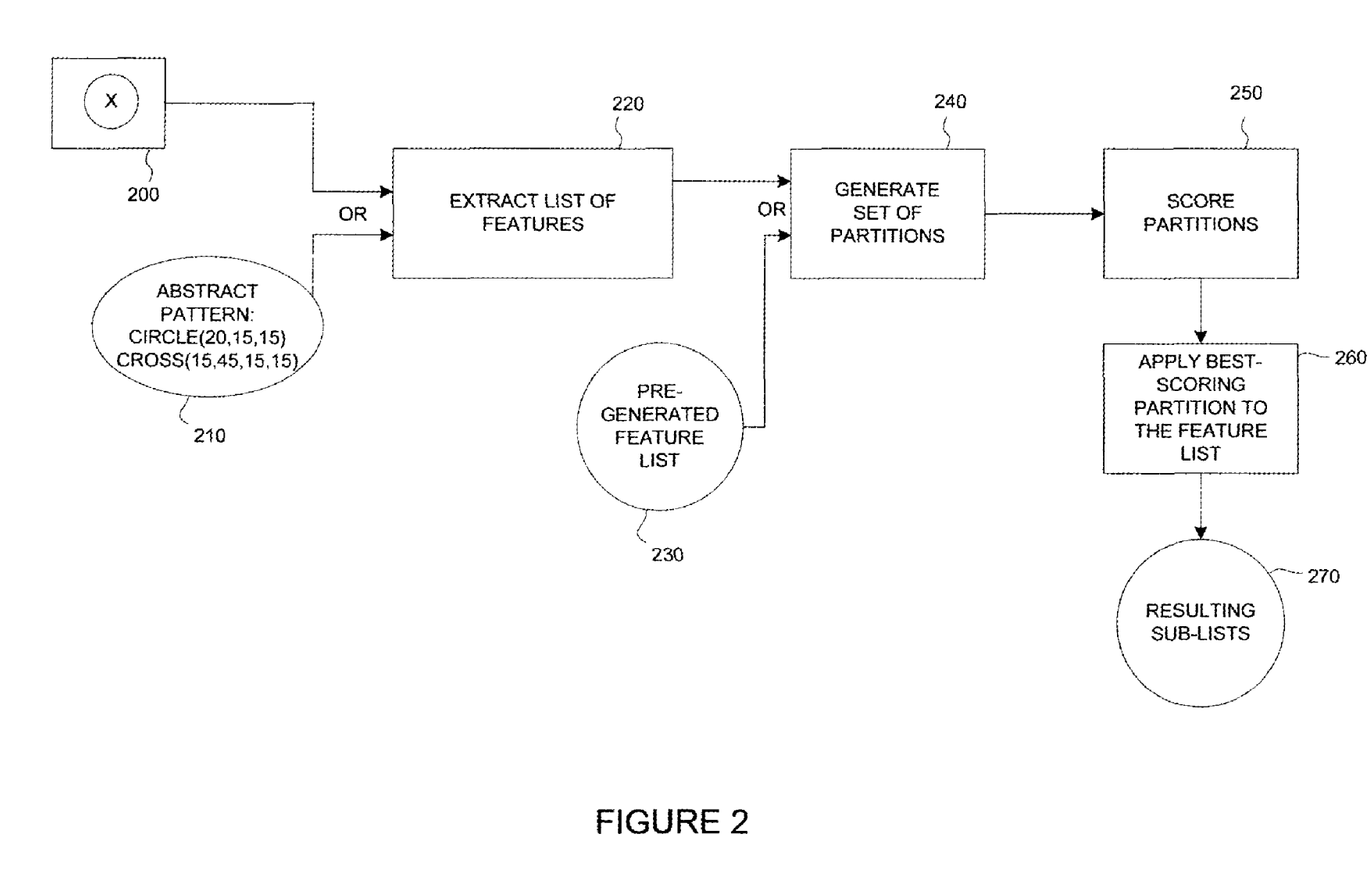
FIG. 2 is a flowchart of an embodiment of the method of the invention.

An embodiment of the method of the invention takes as input either an image of a pattern 200 or an abstract description of a pattern 210 (e.g. a circle of radius 20 at a point 15,15), either of which can be analyzed so as to provide a representative feature list 220, (where a feature is a point of interest in the pattern, possibly augmented by other information such as a gradient angle or magnitude), by any known feature extraction method, or more advantageously by using the two methods described herein below.

Figure 1A:
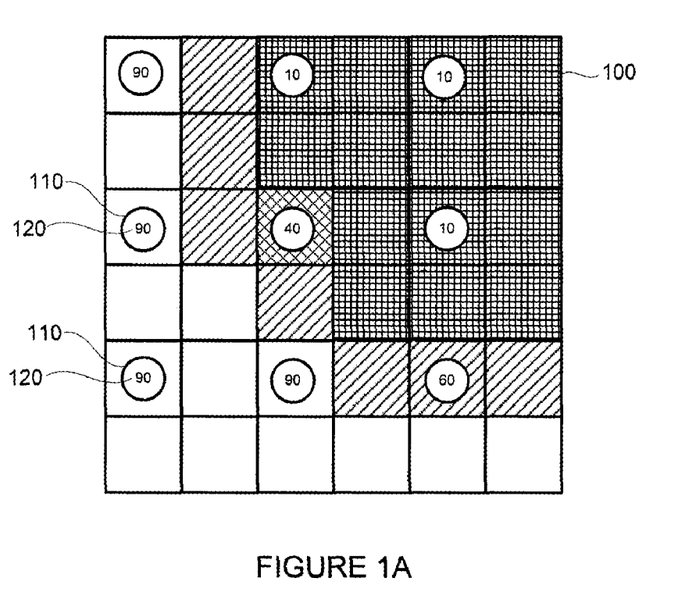
FIG. 1a is a depiction of an exemplary sampling of a pattern image consisting of a set of 2D pixels, each pixel including a brightness level.
Figure 1B:
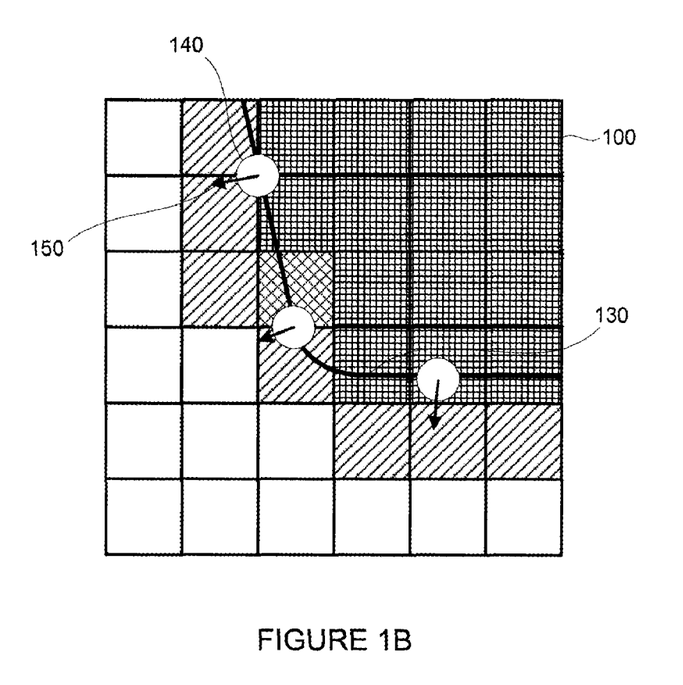
FIG. 1b is a depiction of an exemplary sampling of a pattern image consisting of a set of edges, each edge including an angle of the brightness gradient at that edge.

One preferred embodiment of this step 220 is to sample the pattern image 100 so as to provide a regular array of 2D points 110, each of which includes the image brightness level 120 at that point. FIG. 1a shows nine (9) such point features, each represented by a circle 110 containing a brightness level 120. Another preferred embodiment of 220 is to convert the image 100 into a list of interesting edges 130 using any known edge extraction method to do so, and sample those edges into edge feature points 140 that include the angle 150 of the brightness gradient (or the angle of the edge) at that point 140.

Alternatively, if some other method or tool has described the pattern as a list of features already, those features can be used directly 230, without the need for the pattern processing, such as described above. Note that features are typically 2D image points, but one skilled in the art can readily see that this method works identically with points of any dimensionality, such as 3D.

Figure 3A:
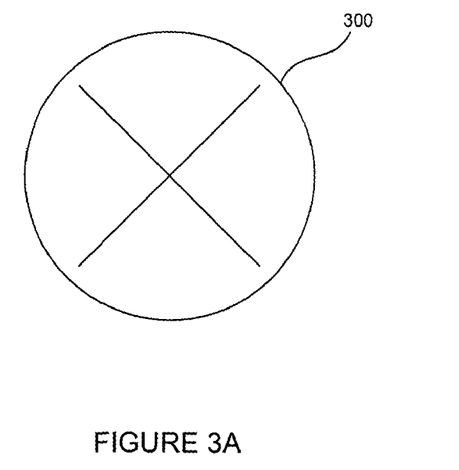
FIG. 3a is a sample image to be subdivided.
Figure 3B:
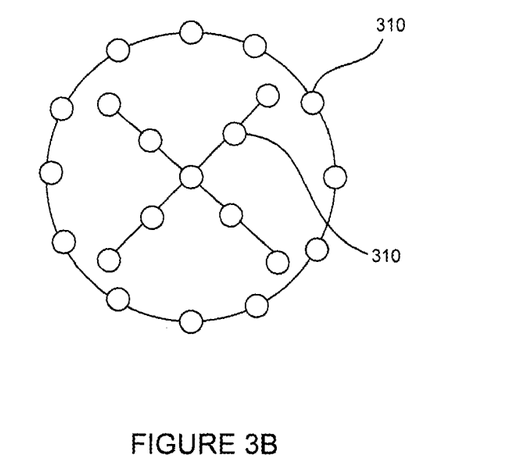
Figure 3C:
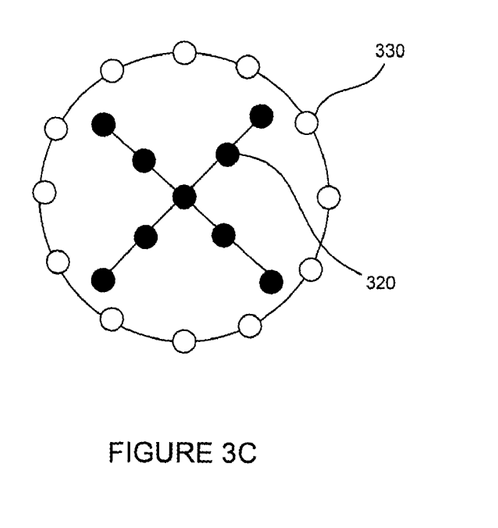
FIG. 3c is a first candidate partition of the set of feature points of FIG. 3b.
Figure 3D:
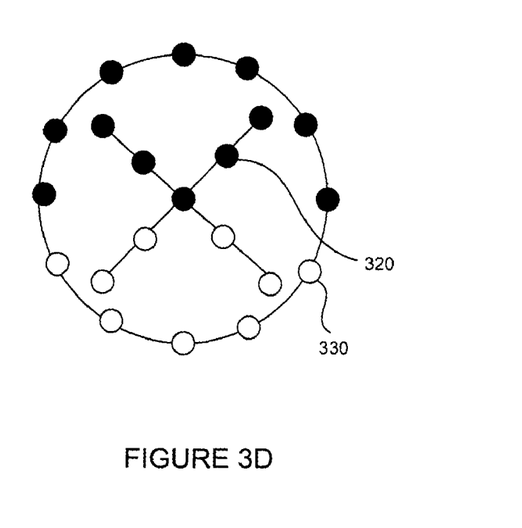
FIG. 3d is a second candidate partition of the set of feature points of FIG. 3b.

Using the feature list (from either step 220 or 230), step 240 generates a set of partitions of the list, where each partition includes a portion of the list. Each partition might have only a single sub-list, or it might have many sub-lists. Certain features from the original list might not appear on any sub-list, or a feature or features might appear on multiple sub-lists. Any method known in the art can be used to generate this set of partitions, such as any clustering algorithm, or any spatial subdivision algorithm. As an example, FIG. 3a shows a sample "image" 300 to be subdivided. FIG. 3b shows a sample breakdown of the image into feature points 310, as described above. FIGS. 3c and 3d show two different candidate partitions of that list of features, where the black circles 320 are partitioned into one list, and the white circles 330 into another. The best methods are those that tend to yield sub-lists that are spatially small, that is, where features that are near each other tend to be in the same sub-list.

Figure 2A:
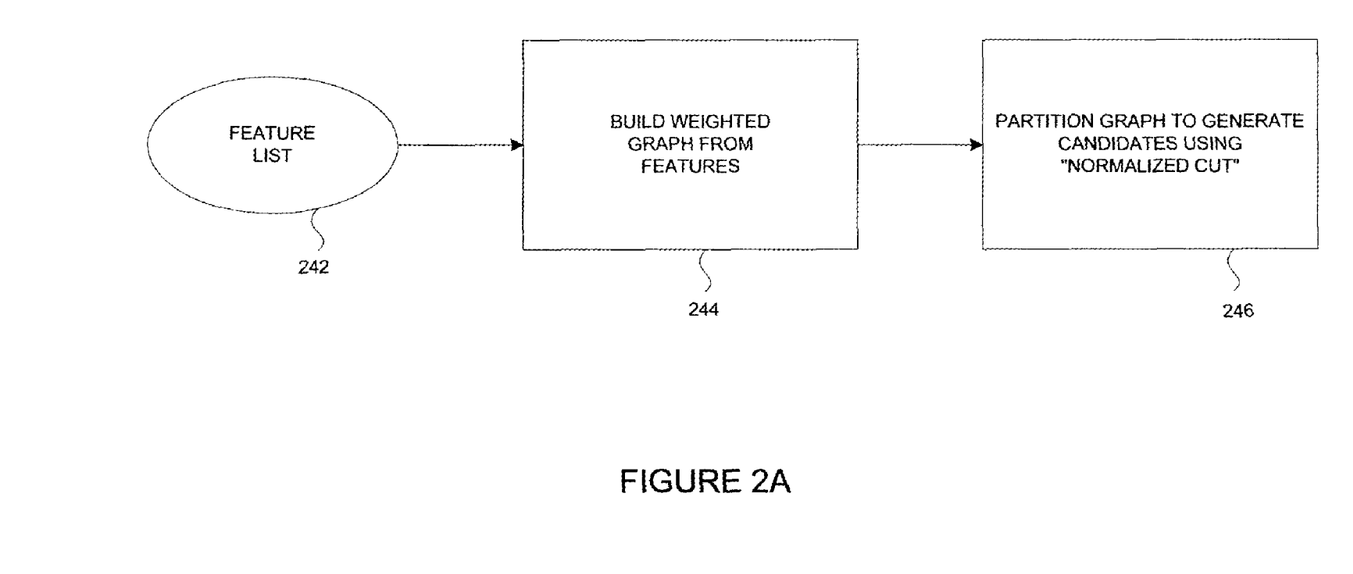
FIG. 2a is a flowchart of the step of generating a set of partitions of FIG. 2.

A preferred embodiment for this step 240 is the "Normalized Cut" algorithm 246, as published in the article "Normalized Cuts and Image Segmentation" by Shi and Malik, 1997, herein incorporated by reference. To utilize this algorithm, the feature list is input 242 for conversion 244 into a weighted graph. The weighted graph is constructed by fully connecting the feature points to make a graph, and then setting the weights on each link based on the distance between those represented feature points.

Note that some weights might be zero, in which case those links can be ignored, and the fully connected graph is equivalent to a sparsely connected graph with those zero-weight links missing. This does not affect the method, though it may allow a particular implementation to be more efficient if it can take advantage of the smaller number of links.

Optionally, the weights can be set based on other values such as similarity of angle, magnitude, or any other values that may be available as part of the features themselves. Larger weights represent a pair of points that should stay in the same sub-lists together, while smaller weights indicate points that can be broken apart more easily. Therefore, in a preferred embodiment, weights decrease as the distance between feature points increases. Exact formulas, and the weightings of other feature characteristics, will vary based on the pattern domain, but any formula can be used and still remain within the spirit of the invention. The Normalized Cut method is one that generates multiple partitions which are pairs of sub-lists, where each node (or feature) appears in exactly one of the two lists. These partitions are generated in such a way that the total weight of links between elements of the two sub-lists is small, and the total weight of links between elements within each sub-list is large. This nicely meets the criteria recognized by the invention for a good partition, when weights are high for features spatially near to each other.

Figure 4A:
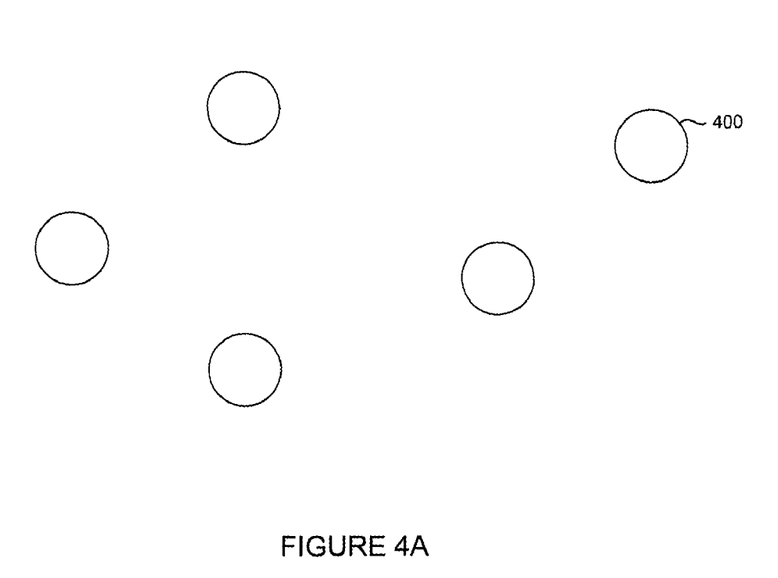
FIG. 4a is an example of a set of feature points, each point having only position information.
Figure 4B:
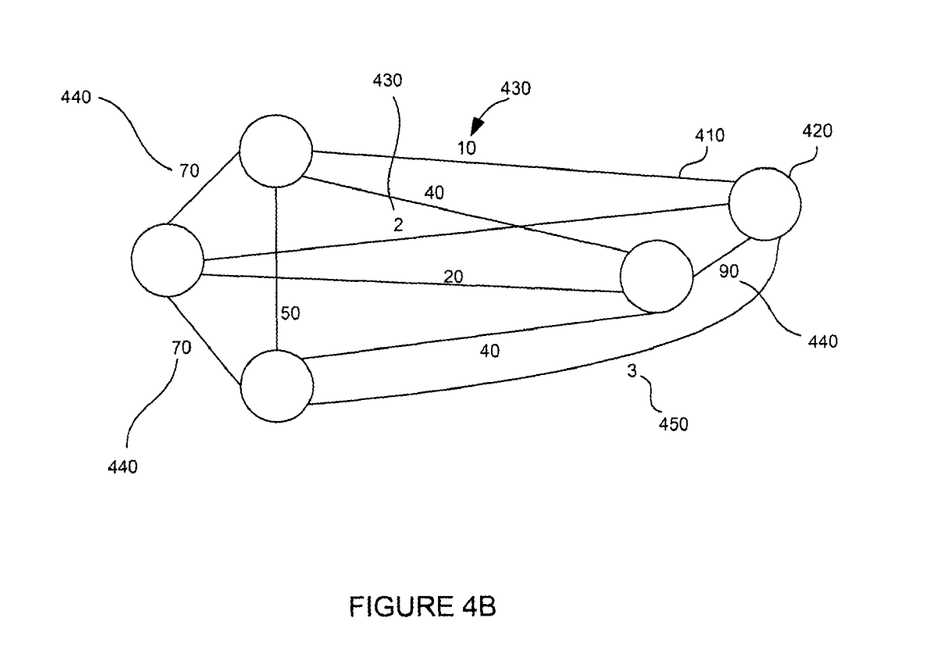
FIG. 4b is a fully connected graph of the set of feature points of FIG. 4a, including links having weights attached.

FIG. 4a is an example of a set of five feature points 400 each point having only position information. FIG. 4b shows a fully connected graph, where the links 410 between nodes 420 have weights 430 attached, with higher weights 440 on links between nodes near each other, and lower weights 450 on lines between more mutually distant nodes. When "Normalized Cut" is applied to this graph using the methods as published in the article cited above, it yields a list of partitions, each of which breaks the graph into two sub-graphs, one of which may be empty. These sub-graphs can be directly converted back into feature sub-lists, since each node in the graph represents exactly one feature point. In the example of FIG. 4b, the three nodes on the left will likely become one sub-list, and the two nodes on the right will become another sub-list, as the links between those sets of nodes have much lower weights than the links within each set.

Figure 2B:
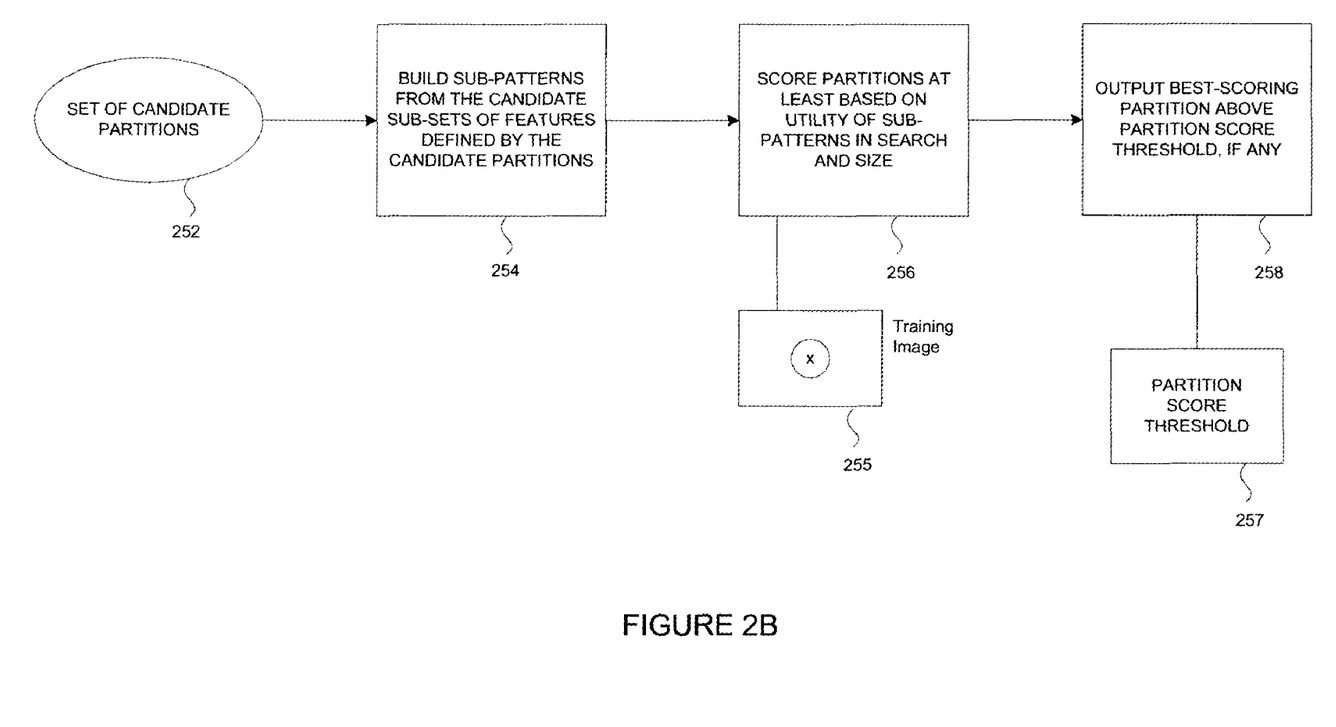
FIG. 2b is a is a flowchart of the step of scoring the partitions of FIG. 2.

A scoring function 250 is then applied to each candidate partition. The scoring function can take into account a number of factors. One embodiment of this function scores partitions based on the spatial coherence of the features in each sub-list, where "spatial coherence" refers to features that have positions near to each other, relative to the distances of other features. Since the node weights used for the preferred embodiment of the partitioning method are higher for features that are close to one another, those weights can easily be summed and used in this embodiment. Another embodiment determines the score based on overall spatial size of the area spanned by the feature points (e.g. as represented by the smallest bounding box that includes all the feature points) included in each sub-list. Another embodiment determines the score based on the number of feature points in each sub-list. A preferred embodiment of the function uses the total amount of weight in links "cut" by the partition algorithm (for the "Normalized Cut" partitioning method described above), and another preferred embodiment builds a search pattern 254 from each feature sub-set 252 and bases the score on the overall "suitability" (discussed below) of the sub-list as a search pattern on the original image 255. A preferred embodiment of this function is one that takes into account all of these elements 256 in determining the score. In this final embodiment, each scoring method is applied to the sub-lists to determine a set of scores. Those scores are combined, either by simply summing them or by computing a weighted average based on the applicability of each individual method in the target domain or by any other reasonable method, and the total score is used.

The last factor mentioned, that of "suitability" as a search pattern, depends on the particular algorithm that might later be used to do searching using the result of this invention. However, the "suitability" metric will likely include "degeneracy". For example, a sub-list where all points lie on the same line is probably not a suitable search pattern, nor is one where they lie on the same circle if the search will involve rotational uncertainty. The "suitability" metric will also likely include "redundancy" within the original pattern. For example, a set of features that can be matched at multiple locations, multiple angles, and/or multiple scales, etc., within the original pattern will probably yield undesirable and possibly unacceptable confusion during a search.

A preferred embodiment of this metric is to run the search algorithm itself on the training image—if that search algorithm is known at the time this method is used. If the search returns only one match, the prospective sub-pattern scores well, i.e., is "suitable"; if it returns multiple matches or confusion about where the sub-pattern is located, the sub-pattern scores poorly, i.e., is "unsuitable". One skilled in the art will readily recognize that any search algorithm will have certain factors that make some patterns easier to find (i.e., more "suitable") than others, and this invention allows those factors, whatever they may be, to affect the "suitability" of the sub-pattern, and thereby affect the score of the partitions.

There may be a score threshold 257 for this step, and that score threshold might be set outside the algorithm, or might be fixed within the algorithm, or might be based on a combination of multiple such values. If no partition has a score above this threshold, then the list of features is deemed to be one that cannot be usefully sub-divided.

Otherwise, the top-scoring candidate partition is then used to create sub-lists from the original feature list 260. A partition specifies which feature points go into which sub-lists. The set of sub-lists generated by this step, if any, is returned as the output of the algorithm 270. One skilled in the art can readily see that these output sub-lists may then be returned to the algorithm as a pre-generated feature list 230, in which case the sub-division can be further refined by repeated, recursive application of this method.

Other variants and embodiments will occur to those skilled in the art, without departing from the spirit and scope of the invention. Accordingly, the invention is not intended to be limited by the detailed description, except as set forth in the following claims.

The invention claimed is:

1. A method for partitioning a pattern into optimized sub-patterns, the method comprising:
   providing a list of features of the pattern;
   generating a set of candidate partitions using the list of features of the pattern;
   scoring each candidate partition of the set of candidate partitions by building sub-patterns using the set of candidate partitions, wherein each candidate partition is scored using a scoring function based on characteristics of a sub-pattern derived therefrom and wherein the characteristics of the sub-pattern includes an overall "suitability" of the sub-pattern used as a search pattern applied to the original pattern;
   determining a best-scoring partition among the set of candidate partitions;
   applying the best-scoring partition to the list of features so as to provide a plurality of sub-lists of features respectively representing a plurality of optimized sub-patterns.

2. The method of claim 1, wherein providing a list of features includes:
   using at least one sub-list from the plurality of sub-lists of features generated by an earlier application of the method as the list of features of the pattern.

3. The method of claim 1, wherein providing a list of features of the pattern includes:
   providing an image; and
   extracting a list of features from the image.

4. The method of claim 3, wherein extracting a list of features from the images includes:
   sampling the image so as to provide a regular array of pixels.

5. The method of claim 3, wherein extracting a list of features from the images includes:
   using an edge extraction method to provide an edge image; and
   sampling the edge image to provide a plurality of edge feature points.

6. The method of claim 5, wherein each edge feature point includes the angle of the edge at that edge feature point.

7. The method of claim 1, wherein features of the pattern are 2D image points.

8. The method of claim 1, wherein features of the pattern are points of any dimensionality.

9. The method of claim 1, wherein providing a list of features includes:
   providing an abstract pattern description; and
   extracting a list of features from the abstract pattern description.

10. The method of claim 1, wherein providing a list of features includes:
    providing a pre-generated list of features.

11. The method of claim 1, wherein generating a set of candidate partitions using the list of features of the pattern includes:
    using a clustering algorithm.

12. The method of claim 1, wherein generating a set of candidate partitions using the list of features of the pattern includes:
    using a spatial subdivision algorithm.

13. The method of claim 1, wherein generating a set of candidate partitions using the list of features of the pattern includes:
    using a method that yields sub-lists that include pattern features that span an area of the pattern that is spatially small with respect to the area of the entire pattern.

14. The method of claim 1, wherein generating a set of candidate partitions using the list of features of the pattern includes:
    using a method that provides sub-lists having pattern features that are more near to each other than to pattern features in other sub-lists.

15. The method of claim 1, wherein generating a set of candidate partitions using the list of features of the pattern includes:
    building a weighted graph using the list of features of the pattern; and
    partitioning the weighted graph to generate candidate partitions.

16. The method of claim 15, wherein building a weighted graph using the list of features of the pattern includes:
  fully connecting the feature points to make a graph; and setting the weights on each link.

17. The method of claim 15, wherein building a weighted graph using the list of features of the pattern includes:
  sparsely connecting the feature points to make a graph; and setting the weights on each link.

18. The method of claim 16, wherein the weights on each link are based on the distance between each pair of feature points.

19. The method of claim 18, wherein weights decrease as the distance between feature points increases.

20. The method of claim 16, wherein the weights on each link are based on at least one of similarity of angle and similarity of magnitude.

21. The method of claim 16, wherein the weights on each link are based on values associated with the feature points of the pattern.

22. The method of claim 16, wherein the weights on each link are determined such that:
  larger weights represent a pair of features that tend to be together in the same sub-lists of features; and
  smaller weights indicate a pair of features that can be included in different sub-lists of features.

23. The method of claim 15, wherein partitioning the weighted graph to generate candidate partitions includes:
  dividing the weighted graph into two sub-graphs, one of which may be empty; and
  converting the two sub-graphs into two sub-lists of features.

24. The method of claim 15, wherein partitioning the weighted graph to generate candidate partitions includes:
  partitioning the weighted graph using a "normalized cut" method to generate candidate partitions.

25. The method of claim 1, wherein in generating a set of candidate partitions using the list of features of the pattern, at least one candidate partition has only a single sub-list of features of the pattern.

26. The method of claim 1, wherein in generating a set of candidate partitions using the list of features of the pattern, each candidate partition has many sub-lists of features of the pattern.

27. The method of claim 1, wherein in generating a set of candidate partitions using the list of features of the pattern, some features included in the list of features of the pattern do not appear on any sub-list of features of the pattern.

28. The method of claim 1, wherein in generating a set of candidate partitions using the list of features of the pattern, at least one feature of the pattern appears on a plurality of sub-lists of features of the pattern.

29. The method of claim 1, wherein characteristics of the sub-pattern includes:
  spatial coherence of the features corresponding to the sub-pattern.

30. The method of claim 1, wherein characteristics of the sub-pattern includes:
  overall spatial size of the area spanned by the feature points corresponding to the sub-pattern.

31. The method of claim 30, wherein the area spanned by the feature points is represented by the smallest bounding box that includes all the feature points.

32. The method of claim 1, wherein characteristics of the sub-pattern includes:
  the number of feature points in the sub-pattern.

33. The method of claim 1, wherein characteristics of the sub-pattern includes:
  the total amount of weight in links "cut" by the partition algorithm to create the sub-pattern.

34. The method of claim 1, wherein characteristics of the sub-pattern includes:
  spatial coherence of the features corresponding to the sub-pattern;
  overall spatial size of the area spanned by the feature points corresponding to the sub-pattern;
  the number of feature points in the sub-pattern;
  the total amount of weight in links "cut" by the partition algorithm to create the sub-pattern; and
  the overall "suitability" of the sub-pattern used as a search pattern applied to the original pattern.

35. The method of claim 1, wherein the overall "suitability" of the sub-pattern used as a search pattern applied to the original pattern depends on:
  the search algorithm used.

36. The method of claim 1, wherein the overall "suitability" of the sub-pattern used as a search pattern applied to the original pattern depends on:
  degeneracy of the features of a sub-pattern.

37. The method of claim 1, wherein the overall "suitability" of the sub-pattern used as a search pattern applied to the original pattern depends on:
  redundancy of the sub-pattern within the original pattern.

38. The method of claim 1, wherein determining a best-scoring partition among the set of candidate partitions includes:
  using a partition score threshold.

39. The method of claim 38, wherein the partition score threshold is settable.

40. The method of claim 38, wherein the partition score threshold is predetermined.

41. The method of claim 38, wherein the partition score threshold includes a portion that is predetermined, and a portion that is settable.

42. The method of claim 38, wherein if no candidate partition has a score above the partition score threshold, then the list of features of the candidate partition is deemed to be one that cannot be usefully sub-divided.

43. A method for dividing a pattern into a plurality of sub-patterns, each sub-pattern being adapted for use with an image search method that can provide a plurality of sub-pattern search results, the method comprising:
  representing the pattern as a plurality of feature points;
  generating candidate partitions of the plurality of feature points;
  scoring the candidate partitions by examining characteristics of each potential sub-pattern of each candidate partition, wherein each candidate partition is scored using a scoring function based on characteristics of a sub-pattern derived therefrom and wherein the characteristics of the sub-pattern includes an overall "suitability" of the sub-pattern used as a search pattern applied to the original pattern;
  selecting the highest-scoring partition;
  applying it to the plurality of feature points so as to create one or more sub-pluralities of feature points.

44. The method of claim 43, wherein the sub-pluralities of feature points are used as sub-patterns by an image search method that is adapted to use pluralities of feature points.

45. The method of claim 43, wherein the characteristics of each potential sub-pattern of each candidate partition include:
  area, number of feature points, and suitability of the sub-pattern for use with a particular search method.

* * * * *